(12) United States Patent
Matsuda et al.

(10) Patent No.: US 11,434,941 B2
(45) Date of Patent: Sep. 6, 2022

(54) LIFT ARM LIFTING AND LOWERING MECHANISM

(71) Applicant: KUBOTA CORPORATION, Osaka (JP)

(72) Inventors: Shinichiro Matsuda, Sakai (JP); Daisuke Miyazaki, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 17/299,815

(22) PCT Filed: Nov. 18, 2019

(86) PCT No.: PCT/JP2019/045106
§ 371 (c)(1),
(2) Date: Jun. 4, 2021

(87) PCT Pub. No.: WO2020/116142
PCT Pub. Date: Jun. 11, 2020

(65) Prior Publication Data
US 2022/0025912 A1   Jan. 27, 2022

(30) Foreign Application Priority Data

Dec. 5, 2018 (JP) .............................. JP2018-228446

(51) Int. Cl.
*F15B 15/20* (2006.01)
*F15B 20/00* (2006.01)
(Continued)

(52) U.S. Cl.
CPC ............ *F15B 15/204* (2013.01); *A01B 63/10* (2013.01); *F15B 15/1447* (2013.01);
(Continued)

(58) Field of Classification Search
CPC .. F15B 15/204; F15B 15/149; F15B 15/1428; F15B 20/00; F15B 20/007; F15B 13/024; F15B 13/027; F15B 13/0405; A01B 63/10
(Continued)

(56) References Cited

U.S. PATENT DOCUMENTS 2,914,085 A * 11/1959 Mercier ................ F16K 15/044
                                                        137/539.5
3,200,798 A *  8/1965 Mansfield ............. F02B 75/044
                                                        123/48 B
(Continued)

FOREIGN PATENT DOCUMENTS

CN      104564908 A      4/2015
DE      43 11 856 A1    10/1994
(Continued)

OTHER PUBLICATIONS

Official Communication issued in International Patent Application No. PCT/JP2019/045106, dated Jan. 28, 2020.
(Continued)

*Primary Examiner* — Dustin T Nguyen
(74) *Attorney, Agent, or Firm* — Keating and Bennett, LLP

(57) ABSTRACT

A lift arm lifting and lowering mechanism cylinder case provided with a cylinder portion into which oil is fed, a piston slidable inside the cylinder portion to define a hydraulic chamber and receiving hydraulic pressure of the hydraulic chamber on a front surface, a safety valve provided to the piston to discharge the oil inside the hydraulic chamber to the outside when the hydraulic pressure of the hydraulic chamber becomes greater than or equal to a predetermined value, and a lift arm supported by the cylinder case and rotatable in conjunction with movement of the piston, in which the piston includes an oil passage allowing communication between a rear surface of the piston and the front surface, and the oil passage includes a containing portion provided to open on the axially front surface side and capable of containing the safety valve, and a non-containing portion provided on the axially rear surface side relative to the containing portion and incapable of containing the safety valve.

3 Claims, 17 Drawing Sheets

(51) Int. Cl.
*A01B 63/10* (2006.01)
*F15B 15/14* (2006.01)
*F15B 13/02* (2006.01)
*F15B 13/04* (2006.01)

(52) U.S. Cl.
CPC ............ *F15B 20/00* (2013.01); *F15B 20/007* (2013.01); *F15B 13/024* (2013.01); *F15B 13/027* (2013.01); *F15B 13/0405* (2013.01); *F15B 15/1428* (2013.01); *F15B 2211/55* (2013.01)

(58) Field of Classification Search
USPC ...... 91/422; 92/181 R, 181 P, 182, 183, 184, 92/185; 123/47 R, 78 R
See application file for complete search history.

(56) References Cited

U.S. PATENT DOCUMENTS

| | | | | |
|---|---|---|---|---|
| 3,808,946 | A * | 5/1974 | Bell | F15B 15/16 91/422 |
| 4,391,592 | A | 7/1983 | Hundertmark | |
| 4,490,120 | A * | 12/1984 | Hundertmark | B63H 20/10 91/401 |
| 5,183,075 | A | 2/1993 | Stein | |
| 5,609,300 | A * | 3/1997 | Conatser | F16K 15/044 239/570 |
| 5,975,967 | A * | 11/1999 | Nishi | F15B 15/149 29/523 |
| 9,903,488 | B2 * | 2/2018 | Nakamura | F16K 15/063 |
| 10,408,058 | B2 * | 9/2019 | Doyle | F16J 1/22 |
| 2012/0285556 | A1 | 11/2012 | Erb | |
| 2016/0160645 | A1 | 6/2016 | Doyle | |
| 2017/0009900 | A1 * | 1/2017 | Kubo | F16K 1/14 |

FOREIGN PATENT DOCUMENTS

| | | |
|---|---|---|
| EP | 0 631 074 A1 | 12/1994 |
| JP | 53-077248 U | 6/1978 |
| JP | 55-028134 U | 2/1980 |
| JP | 55-123210 U | 9/1980 |
| JP | 56-072971 U | 6/1981 |
| JP | 57-087790 A | 6/1982 |
| JP | 59-090671 U | 6/1984 |
| JP | 59-194110 A | 11/1984 |
| JP | 02-012506 U | 1/1990 |
| JP | 2012-021551 A | 2/2012 |

OTHER PUBLICATIONS

Official Communication issued in corresponding European Patent Application No. 19893984.5, dated Jul. 13, 2022.

* cited by examiner

LIFT ARM LIFTING AND LOWERING MECHANISM

BACKGROUND OF THE INVENTION

1. Field of the Invention

The present invention relates to a technique of a lift arm lifting and lowering mechanism.

2. Description of the Related Art

Conventionally, a technique of a lift arm lifting and lowering mechanism used in a working vehicle such as a tractor has been known. An example is disclosed in JP S59-194110 A.

JP S59-194110 A discloses a tractor including a rotary tiller lifting and lowering hydraulic cylinder structure for lifting and lowering a rotary tiller for cultivating a field. The hydraulic cylinder structure is provided with a hydraulic cylinder connected to an oil tank via an oil passage, and a piston head slidably disposed inside the hydraulic cylinder and forming a hydraulic chamber. The hydraulic cylinder structure is configured to lift and lower the rotary tiller via a lift arm provided to be rotatable upward and downward in conjunction with the sliding of the piston head.

The hydraulic cylinder structure as disclosed in JP S59-194110 A is configured to rotate the lift arm upward by sliding the piston head by hydraulic pressure of oil fed to the hydraulic chamber via the oil passage. The hydraulic cylinder structure is also configured to rotate the lift arm downward by discharging the oil in the hydraulic chamber via the oil passage.

When the lift arm is maintained at a position of being rotated upward in the hydraulic cylinder structure mentioned above, the discharging of the oil in the hydraulic chamber via the oil passage is restricted. In the state where the discharging of the oil in the hydraulic chamber is restricted as described above, when the temperature of the oil inside the hydraulic chamber rises, the volume of the oil may increase and thus the hydraulic pressure may rise. In this case, the hydraulic cylinder structure fails to reduce or prevent an excessive rise in the hydraulic pressure inside the hydraulic chamber. Thus, a further improvement is desired.

SUMMARY OF THE INVENTION

Preferred embodiments of the present invention provide lift arm lifting and lowering mechanisms that are each capable of reducing or preventing an excessive increase in hydraulic pressure inside a hydraulic chamber.

The problem to be solved by preferred embodiments of the present invention is as described above, and the following will describe example solutions to this problem.

A lift arm lifting and lowering mechanism according to a preferred embodiment of the present invention includes a cylinder case provided with a cylinder portion into which oil is fed; a piston slidably disposed inside the cylinder portion to define a hydraulic chamber and receiving hydraulic pressure of the hydraulic chamber on a first surface; a safety valve provided to the piston to discharge the oil inside the hydraulic chamber to an outside when the hydraulic pressure of the hydraulic chamber becomes greater than or equal to a predetermined value; and a lift arm supported by the cylinder case and rotatable in conjunction with movement of the piston, in which the piston includes an oil passage allowing communication between a second surface of the piston and the first surface of the piston, and the oil passage includes a containing portion provided to open on the first surface side and capable of containing the safety valve; and a non-containing portion provided on the second surface side relative to the containing portion and incapable of containing the safety valve.

In addition, the safety valve includes a valve seat portion fixed inside the containing portion and having a through hole through which the oil is allowed to flow; a valve disc portion that is movable inside the containing portion and capable of closing the through hole by contacting the valve seat portion from the second surface side; and a biasing portion capable of biasing the valve disc portion toward the first surface side.

In addition, the containing portion includes a valve seat containing portion containing the valve seat portion; and a valve disc containing portion continuous with the valve seat containing portion and with a diameter smaller than a diameter of the valve seat containing portion, and containing the valve disc portion.

In addition, the through hole includes a valve disc receiving portion provided at an end portion of the valve seat portion on the second surface side and with a circular truncated cone shape that increases in diameter toward the second surface side, and the valve disc portion includes a spherical portion having a spherical shape capable of closing the valve disc receiving portion; and a retaining portion engaging with the biasing portion and retaining the spherical portion.

In addition, the through hole includes a valve disc receiving portion provided at an end portion of the valve seat portion on the second surface side and having a circular truncated cone shape that increases in diameter toward the second surface side, and the valve disc portion includes an engagement portion engaging with the biasing portion; and a protruding portion integrally provided to the engagement portion and with a conical shape that decreases in diameter toward the first surface side to be capable of closing the valve disc receiving portion.

In addition, the valve disc portion includes a side surface opposed to an inner surface of the containing portion, and the side surface includes a groove portion provided over an entire portion in a moving direction.

In addition, the lift arm lifting and lowering mechanism further includes a piston rod to transmit sliding movement of the piston to the lift arm, in which the piston includes a rod retaining portion provided to open in the second surface and receiving the piston rod, the rod retaining portion includes a circular truncated cone portion continuous with an edge portion of the opening of the rod retaining portion and with a circular truncated cone shape extending to decrease in diameter toward the first surface side; a columnar portion continuous with the circular truncated cone portion and with a columnar shape extending in an axial direction of the piston; and a bottom portion continuous with the columnar portion and defining a bottom of the rod retaining portion.

In addition, the columnar portion and the containing portion are provided side by side so as to at least partially overlap each other in the axial direction.

In addition, the piston includes a recess provided to open in the first surface, and the containing portion is provided outside the recess.

In addition, the piston includes a recess provided to open in the first surface; and a thickening portion provided to protrude from a bottom of the recess, and the containing portion is provided at the thickening portion.

Various preferred embodiments of the present invention achieve the following effects.

In a lift arm lifting and lowering mechanism according to a preferred embodiment of the present invention, it is possible to reduce or prevent an excessive rise in hydraulic pressure inside the hydraulic chamber.

In a lift arm lifting and lowering mechanism according to a preferred embodiment of the present invention, it is possible to simplify the structure of the safety valve.

In a lift arm lifting and lowering mechanism according to a preferred embodiment of the present invention, it is possible to stabilize the valve disc portion when the valve disc portion receives pressure.

In a lift arm lifting and lowering mechanism according to a preferred embodiment of the present invention, it is possible to make the structure of the safety valve relatively simple.

In a lift arm lifting and lowering mechanism according to a preferred embodiment of the present invention, it is possible to reduce the number of components of the safety valve.

In a lift arm lifting and lowering mechanism according to a preferred embodiment of the present invention, it is possible to provide a flow path to discharge oil.

In a lift arm lifting and lowering mechanism according to a preferred embodiment of the present invention, the rod retaining portion can suitably receive the piston rod.

In a lift arm lifting and lowering mechanism according to a preferred embodiment of the present invention, it is possible to easily obtain a certain thickness between the containing portion and the rod retaining portion in the piston.

In a lift arm lifting and lowering mechanism according to a preferred embodiment of the present invention, it is possible to reduce or prevent exposure of the safety valve from the recess. Thus, the safety valve can be easily retained with respect to the piston.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
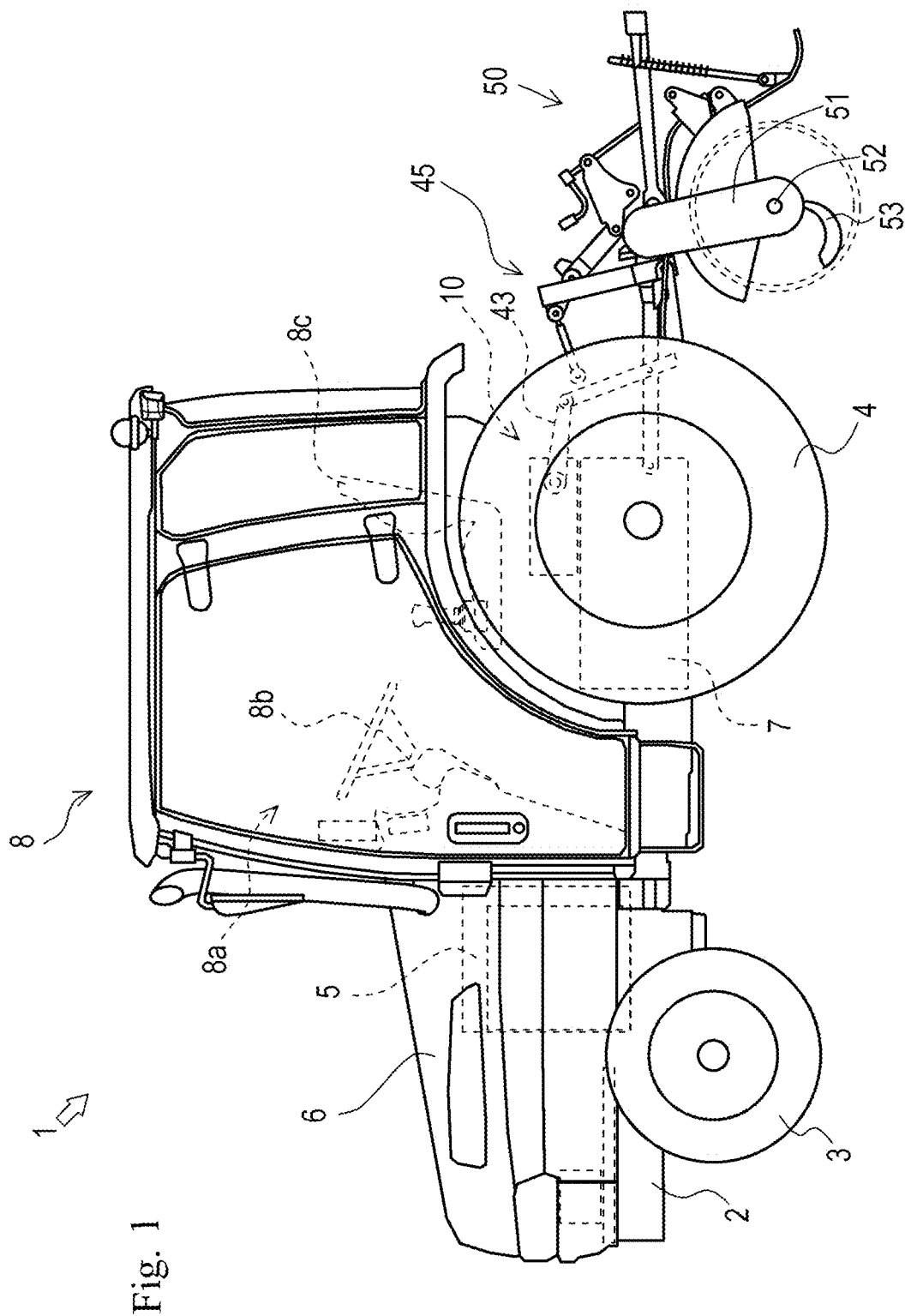
FIG. 1 is a side view showing an overall configuration of a tractor including a lift arm lifting and lowering mechanism according to a first preferred embodiment of the present invention.

First, the overall configuration of a tractor 1 provided with a lift arm lifting and lowering mechanism 10 according to a first preferred embodiment of the present invention will be described with reference to FIG. 1.

The tractor 1 mainly includes a body frame 2, front wheels 3, rear wheels 4, an engine 5, a hood 6, a transmission case 7, a cabin 8, a lift arm lifting and lowering mechanism 10, a link mechanism 45, and a rotary tilling device 50.

The body frame 2 is disposed such that its longitudinal direction is in the front-rear direction. A front portion of the body frame 2 is supported by a pair of left and right front wheels 3 via a front axle mechanism (not shown). The transmission case 7 is provided at a rear portion of the body frame 2. The transmission case 7 contains a transmission device (not shown) and the like. The transmission case 7 is supported by a pair of left and right rear wheels 4 via a rear axle mechanism (not shown).

The engine 5 is provided at a front portion of the body frame 2. The engine 5 is covered by the hood 6. Power of the engine 5 is subjected to a speed conversion at the transmission device, and is then made transmittable to the front wheels 3 via the front axle mechanism and made transmittable to the rear wheels 4 via the rear axle mechanism. The front wheels 3 and the rear wheels 4 are rotationally driven by the power of the engine 5, so that the tractor 1 can travel.

The power of the engine 5 is also subjected to a speed conversion at the transmission device and is then made transmittable to a PTO shaft. In the present preferred embodiment, the rotary tilling device 50 is connected to the PTO shaft. The rotary tilling device 50 is disposed at a rear portion of the tractor 1 and includes a power transmission case 51, a rotary shaft 52, and a plurality of blades 53. The power transmission case 51 transmits the power from the PTO shaft to the rotary shaft 52 to rotate the rotary shaft 52. In this manner, the rotary tilling device 50 can cultivate a field or the like by rotating the plurality of blades 53.

The rotary tilling device 50 is connected to the lift arm lifting and lowering mechanism 10, which will be described later, via the link mechanism 45. In the present preferred embodiment, the link mechanism 45 defines a three-point linkage. Note that the link mechanism 45 is not limited to the three-point linkage and various manners may be used.

The cabin 8 is provided at a middle portion of the tractor 1 in the front-rear direction (behind the engine 5). An occupant space 8a in which an operator rides is inside the cabin 8. A steering wheel 8b to adjust the steering angle of the front wheels 3, a seat 8c for the operator to be seated, and the like are disposed in the occupant space 8a. Appropriate operation tools are also disposed in the occupant space 8a.

Next, the configuration of the lift arm lifting and lowering mechanism 10 will be described with reference to FIGS. 2 to 8.

The lift arm lifting and lowering mechanism 10 supports the rotary tilling device 50 such that it can be lifted and lowered. The lift arm lifting and lowering mechanism 10 is provided at a rear portion of the body frame 2. The lift arm lifting and lowering mechanism 10 includes a cylinder case 11, a piston 14, a safety valve 30, a piston rod 40, an interlocked arm 41, and a lift arm 43.

The cylinder case 11 shown in FIGS. 2 and 3 contains the piston 14, the piston rod 40, and the interlocked arm 41, which will be described later. The cylinder case 11 is disposed above the transmission case 7. The cylinder case 11 has a box shape that opens downward. The interior of the cylinder case 11 communicates with the interior of the transmission case 7 via the opening. The cylinder case 11 includes a cylinder portion 12 and an oil feed passage 13.

The cylinder portion 12 is a portion into which oil (hydraulic oil) is fed. The cylinder portion 12 forms a front-side portion of the cylinder case 11. The cylinder portion 12 has a bottomed cylindrical shape. The cylinder portion 12 has a bottom portion and a side portion. The cylinder portion 12 is disposed such that the bottom surface faces (is inclined) in a diagonally rear-lower direction.

The oil feed passage 13 is an oil passage through which oil flows. The oil feed passage 13 has an end penetrating the bottom portion of the cylinder portion 12 and communicates with the interior of the cylinder portion 12. The other end of the oil feed passage 13 communicates with the transmission case 7 via a predetermined oil passage. A predetermined oil pump (not shown) is provided to the oil passage. Oil reserved inside the transmission case 7 can be fed through the oil feed passage 13 via the oil pump. A predetermined switching valve (not shown) for switching the flowing direction of the oil is provided to the oil feed passage 13. The switching valve can switch between a state where the oil can be fed to the cylinder portion 12 via the oil pump, a state where the oil can be discharged from the cylinder portion 12, and a state where the oil feed passage 13 is closed.

The piston 14 shown in FIGS. 2 to 6 is slidably disposed inside the cylinder portion 12. The piston 14 has a columnar shape corresponding to the interior of the cylinder portion 12. The side surface of the piston 14 slides relative to the inner peripheral surface of the cylinder portion 12. The front surface (surface facing in a diagonally front-up direction) of the piston 14 is opposed to the bottom surface of the cylinder portion 12. The rear surface (surface facing in a diagonally rear-lower direction) of the piston 14 is opposed to the piston rod 40, which will be described later. A hydraulic chamber R enclosing oil fed to the cylinder portion 12 is defined by the front surface of the piston 14, the bottom surface of the cylinder portion 12, and the inner peripheral surface of the cylinder portion 12. The piston 14 includes a recess 15, a rod retaining portion 16, a recessed groove 20, an O-ring 21, and an oil passage 22.

Figure 4:
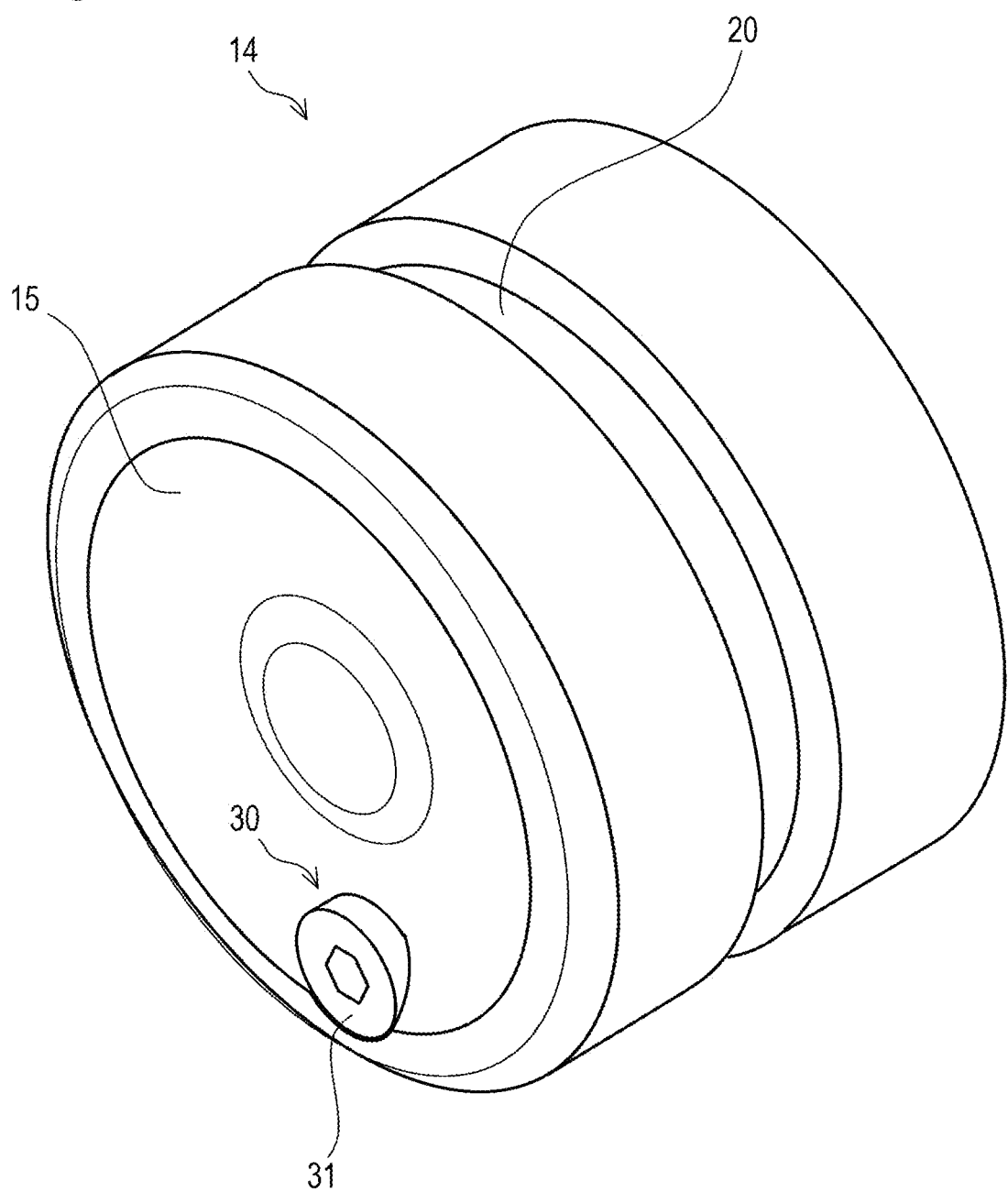
FIG. 4 is a perspective view showing a front surface side of a piston.
Figure 6:
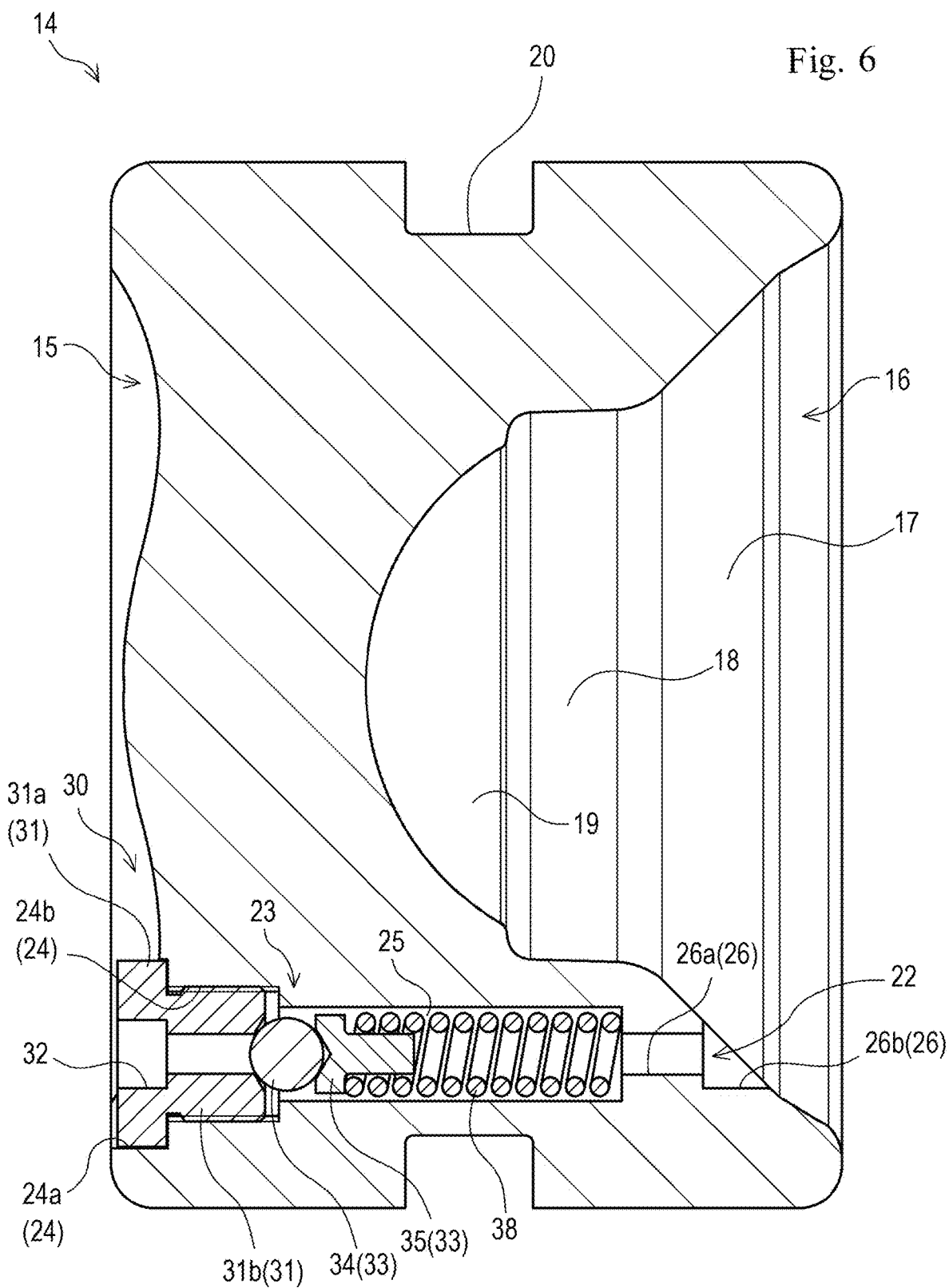
FIG. 6 is a cross-sectional view showing the piston.

The recess 15 shown in FIGS. 4 and 6 is a portion that opens in the front surface of the piston 14 and is recessed toward the rear surface side of the piston 14 in its axial direction (hereinafter referred to as the "axially rear surface side"). The recess 15 has a circular shape as seen in the axial direction. The recess 15 extends over a large portion of the front surface of the piston 14. The recess 15 has a shape that is curvedly recessed in its entirety and curvedly protrudes from the bottom at its central portion. Thus, the recess 15 is structured such that surrounding portions of the central portion are deeper than the central portion.

Figure 5:
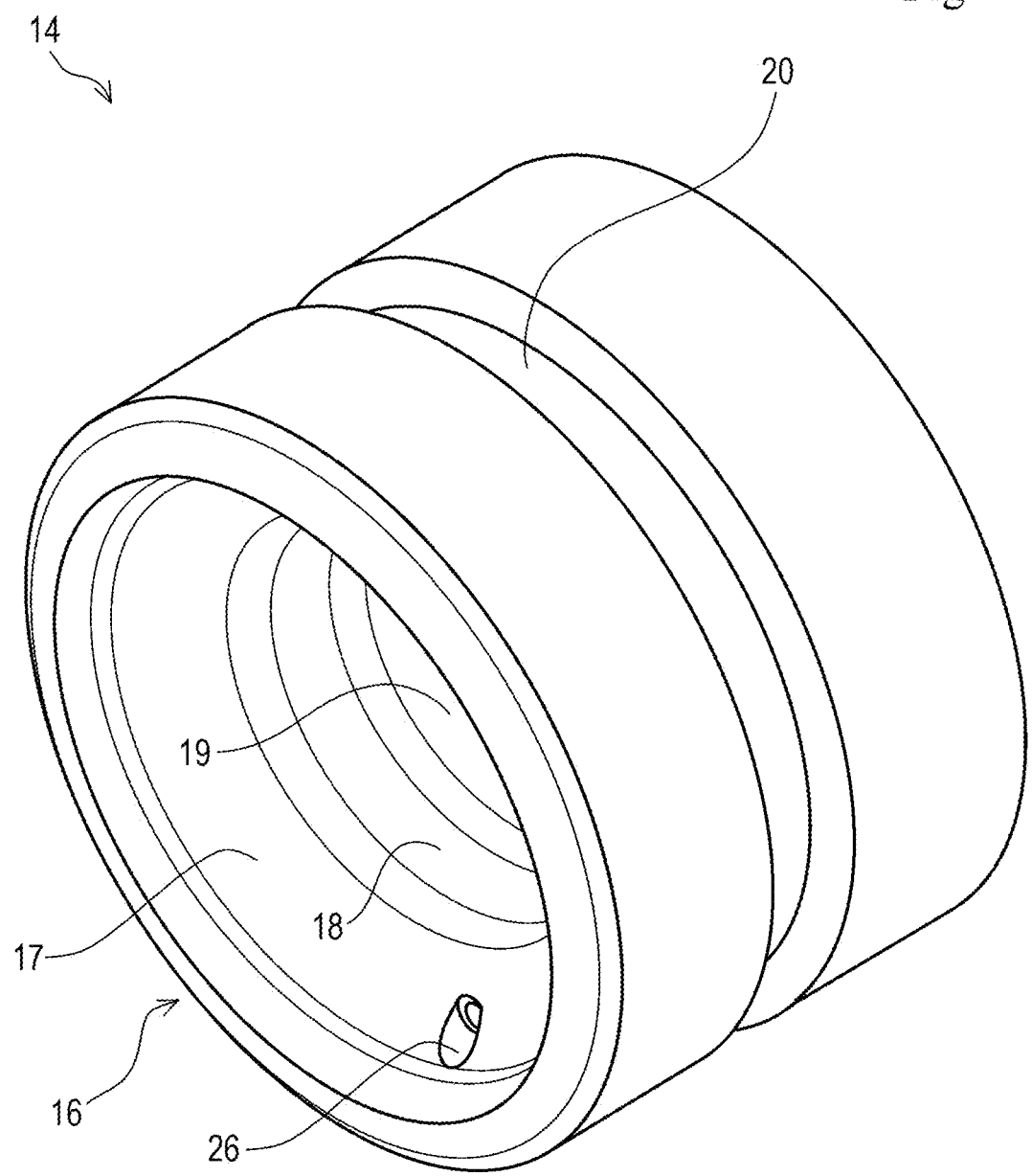
FIG. 5 is a perspective view showing a rear surface side of the piston.

The rod retaining portion 16 shown in FIGS. 5 and 6 is a portion that opens in the rear surface of the piston 14 and is recessed toward the front surface side of the piston 14 in its axial direction (hereinafter referred to as the "axially front surface side"). The rod retaining portion 16 has a circular shape as seen in the axial direction. The rod retaining portion 16 extends over a large portion of the rear surface of the piston 14. The rod retaining portion 16 includes a circular truncated cone portion 17, a columnar portion 18, and a bottom portion 19.

The circular truncated cone portion 17 is a portion that is continuous with the edge portion of the opening of the rod retaining portion 16. The circular truncated cone portion 17 has a circular truncated cone shape that extends to decrease in diameter toward the axially front surface side. That is, the inner peripheral surface of the circular truncated cone portion 17 has a shape of an inclined surface (tapered surface) that decreases in diameter toward the axially front surface side. The illustrated example shows an example where the inclination angle of the side surface of the circular truncated cone portion 17 with respect to the axial line as seen in a cross-sectional view is substantially 45 degrees. In addition, in the illustrated example, the inclination angle of a portion of the side surface close to the edge portion of the opening the circular truncated cone portion 17 is smaller than that of other portions (an acute angle). A portion connecting the circular truncated cone portion 17 and the edge portion of the opening has a curved-surface shape.

The columnar portion 18 is a portion connecting the circular truncated cone portion 17 and the bottom portion 19, which will be described later. The columnar portion 18 is continuous with the circular truncated cone portion 17 on the axially front surface side of the circular truncated cone portion 17. The columnar portion 18 has a substantially columnar shape extending in the axial direction. A portion connecting the columnar portion 18 and the circular truncated cone portion 17 has a curved-surface shape.

The bottom portion 19 is a portion that defines the bottom of the rod retaining portion 16. The bottom portion 19 is continuous with the columnar portion 18 on the axially front surface side of the columnar portion 18. The inner surface of the bottom portion 19 has a curved-surface shape. A portion connecting the bottom portion 19 and the columnar portion 18 has a stepped shape with a diameter smaller than a diameter of the columnar portion 18.

The recessed groove 20 shown in FIGS. 2 to 6 is a groove provided in the side surface of the piston 14. The recessed groove 20 is provided over the entire periphery of an axially central portion of the side surface of the piston 14. The recessed groove 20 has a rectangular shape as seen in a cross-sectional view.

Figure 2:
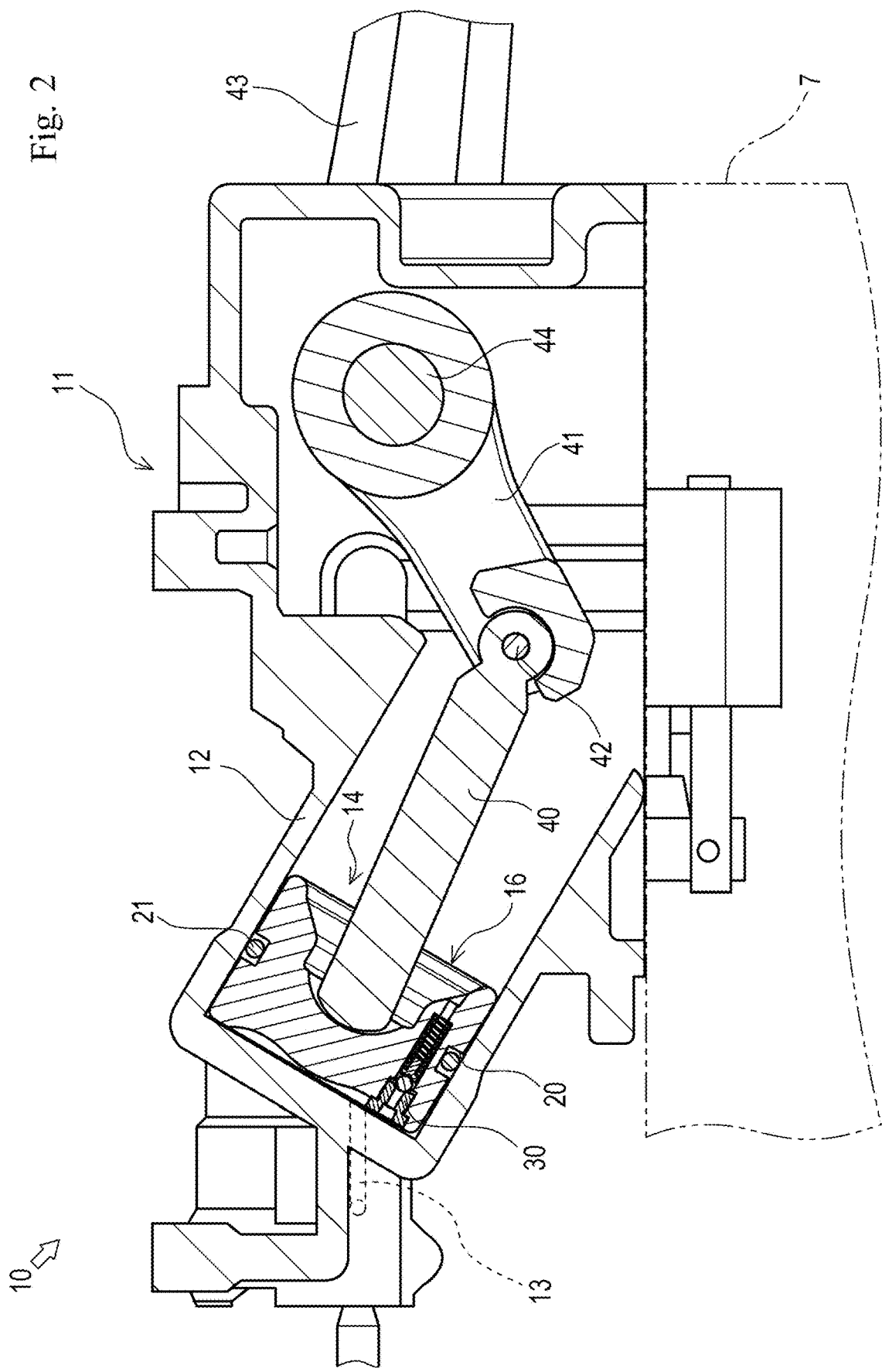
FIG. 2 is a cross-sectional view showing the lift arm lifting and lowering mechanism with a lift arm at a lowered position.
Figure 3:
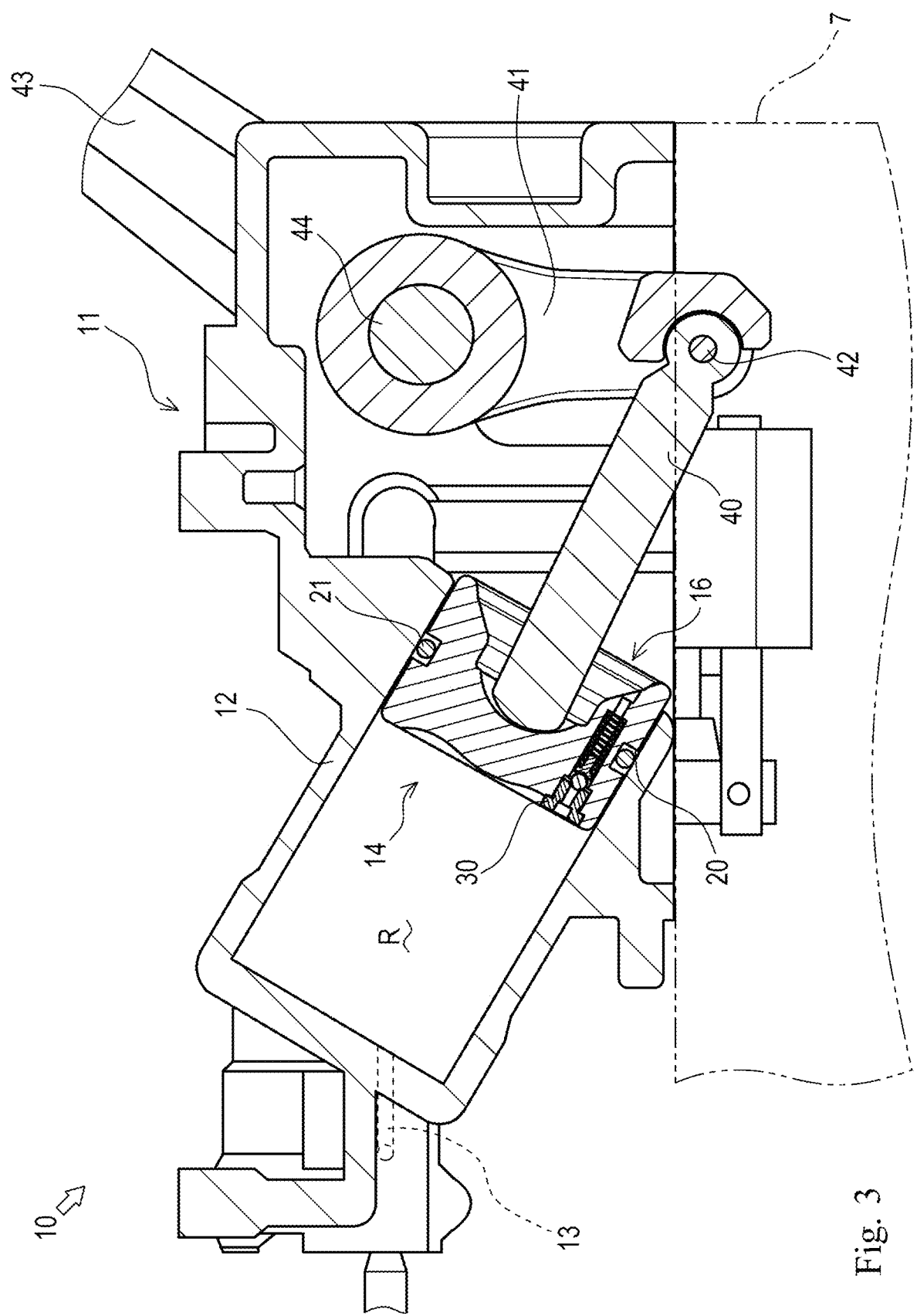
FIG. 3 is a cross-sectional view showing the lift arm lifting and lowering mechanism with the lift arm at a lifted position.

The O-ring 21 shown in FIGS. 2 and 3 is an annular member to seal oil in the hydraulic chamber R. The O-ring 21 is fitted into the recessed groove 20 and contacts the bottom surface of the recessed groove 20 and the inner peripheral surface of the cylinder portion 12.

Figure 7:
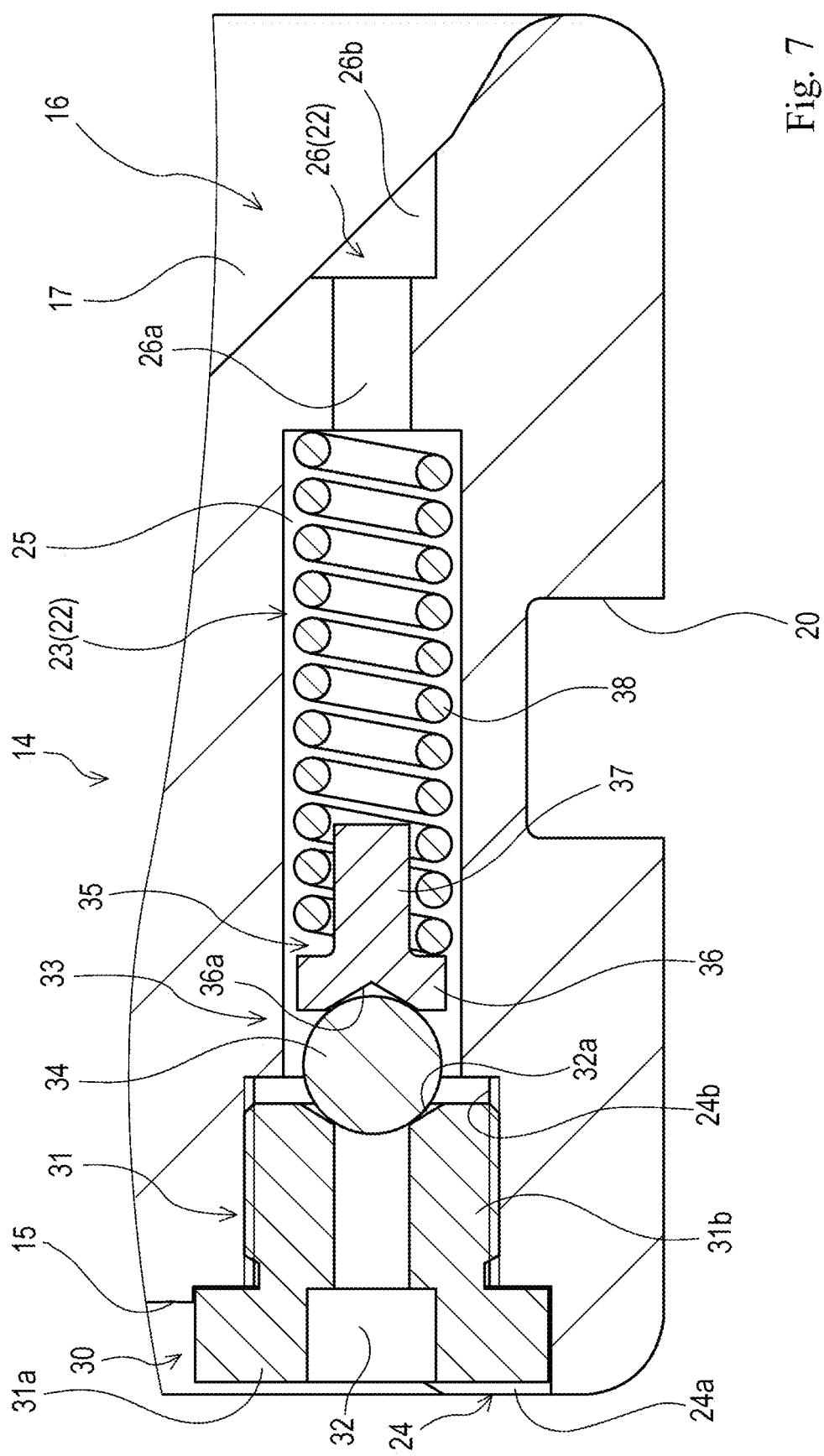
FIG. 7 is an enlarged cross-sectional view showing a safety valve when the hydraulic pressure inside a hydraulic chamber is less than a predetermined value.
Figure 8:
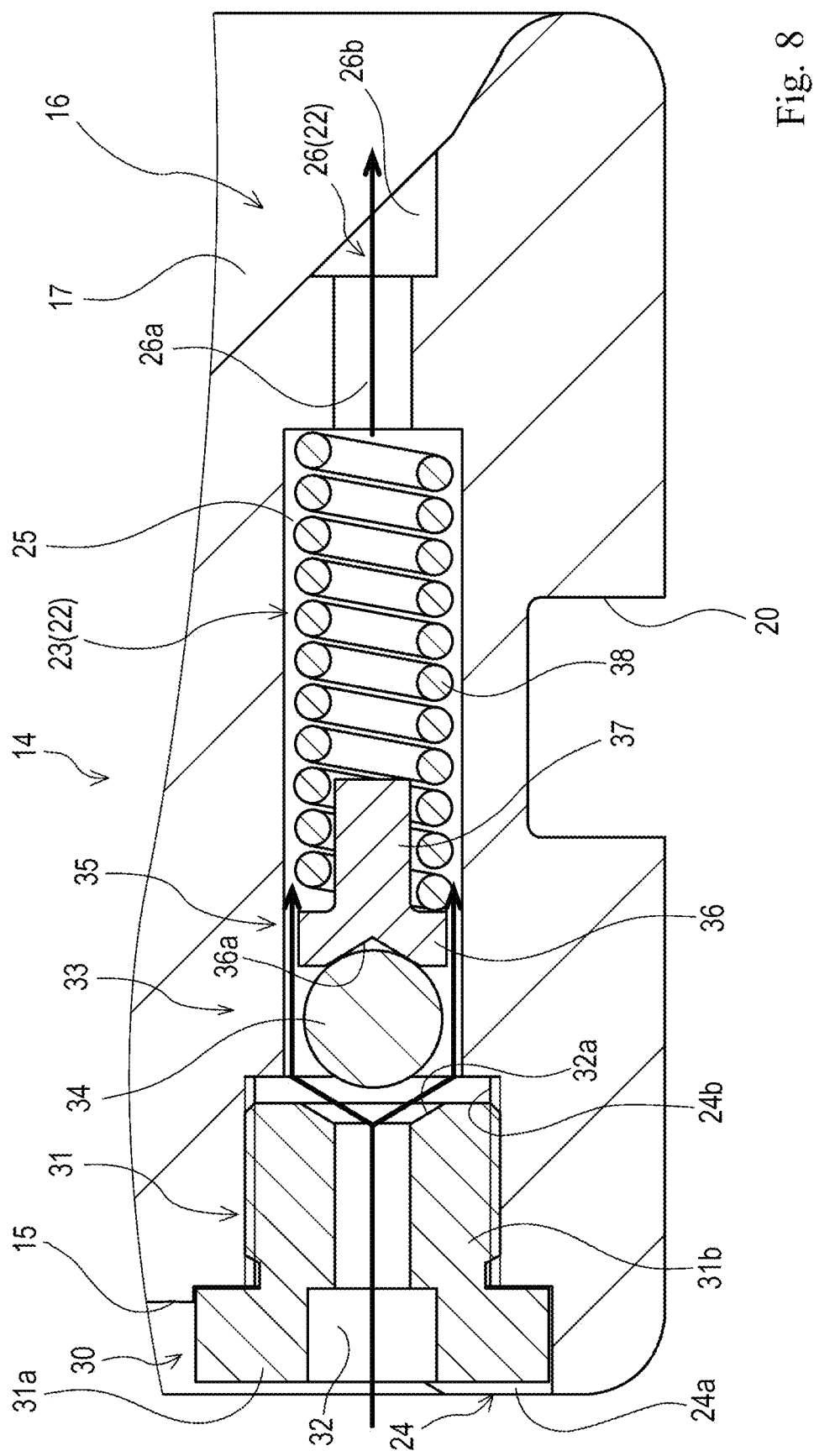
FIG. 8 is an enlarged cross-sectional view showing the safety valve when the hydraulic pressure inside the hydraulic chamber is greater than or equal to the predetermined value.

The oil passage 22 shown in FIGS. 6 to 8 allows communication between the front surface and the rear surface of the piston 14. The oil passage 22 penetrates the piston 14 in the axial direction. The oil passage 22 is provided at a radially outer portion of the piston 14. The oil passage 22 is provided to at least partially overlap the recess 15 and the rod retaining portion 16 as seen in the axial direction. The oil passage 22 has a circular shape as seen in the axial direction. The oil passage 22 includes a containing portion 23 and a non-containing portion 26.

The containing portion 23 shown in FIGS. 7 and 8 is a portion capable of containing the safety valve 30, which will be described later. The containing portion 23 defines a portion of the oil passage 22 on the axially front surface side. The containing portion 23 includes a valve seat containing portion 24 and a valve disc containing portion 25.

The valve seat containing portion 24 is a portion containing a valve seat portion 31 of the safety valve 30, which will be described later. The valve seat containing portion 24 includes an increased diameter portion 24a and a decreased diameter portion 24b. The increased diameter portion 24a is a portion of the valve seat containing portion 24 on the axially front surface side. The increased diameter portion 24a opens in the front surface of the piston 14 to communicate with the recess 15. The decreased diameter portion 24b is a portion of the valve seat containing portion 24 on the axially rear surface side. The decreased diameter portion 24b has a shape with a diameter smaller than a diameter of the increased diameter portion 24a. A female screw portion is provided on the inner surface of the decreased diameter portion 24b.

The valve disc containing portion 25 is a portion containing a valve disc portion 33 and a biasing portion 38 of the safety valve 30, which will be described later. The valve disc containing portion 25 is continuous with the decreased diameter portion 24b of the valve seat containing portion 24 on the axially rear surface side relative to the decreased diameter portion 24b. The valve disc containing portion 25 has a shape with a diameter smaller than a diameter of the decreased diameter portion 24b.

The non-containing portion 26 is a portion incapable of containing the safety valve 30, which will be described later. The non-containing portion 26 includes a decreased diameter portion 26a and an increased diameter portion 26b. The decreased diameter portion 26a is a portion of the non-containing portion 26 on the axially front surface side. The decreased diameter portion 26a is continuous with the valve disc containing portion 25 on the axially rear surface side relative to the valve disc containing portion 25. The decreased diameter portion 26a has a shape with a diameter smaller than a diameter of the valve disc containing portion 25. The increased diameter portion 26b is a portion of the non-containing portion 26 on the axially rear surface side. The increased diameter portion 26b has a shape with a diameter larger than a diameter of the decreased diameter portion 26a. The increased diameter portion 26b opens in the circular truncated cone portion 17 of the rod retaining portion 16.

As shown in FIG. 6, the above-mentioned containing portion 23 and the columnar portion 18 of the rod retaining portion 16 are provided side by side so as to at least partially overlap each other in the axial direction of the piston 14. In the present preferred embodiment, a portion of the valve disc containing portion 25 on the axially rear surface side and substantially the entire portion of the columnar portion 18 are provided side by side so as to overlap each other in the axial direction. In this manner, a certain thickness is obtained between the portion of the valve disc containing portion 25 on the axially rear surface side and substantially the entire portion of the columnar portion 18.

The safety valve 30 shown in FIGS. 6 to 8 is capable of switching between opening and closing the oil passage 22. The safety valve 30 opens the oil passage 22 when the hydraulic pressure of the hydraulic chamber R becomes greater than or equal to a predetermined value. The safety valve 30 is contained in the containing portion 23. The safety valve 30 includes the valve seat portion 31, the valve disc portion 33, and the biasing portion 38.

The valve seat portion 31 shown in FIGS. 7 and 8 is a member fixed in the valve seat containing portion 24. The valve seat portion 31 includes a collar portion 31a, a body portion 31b, and a through hole 32. The collar portion 31a is a portion of the valve seat portion 31 on the axially front surface side. The collar portion 31a is contained in the increased diameter portion 24a of the valve seat containing portion 24. The collar portion 31a has a columnar shape corresponding to the increased diameter portion 24a of the valve seat containing portion 24. The collar portion 31a contacts the bottom surface (front surface) of the increased diameter portion 24a so that the movement of the valve seat portion 31 toward the axially rear surface side is restricted.

The body portion 31b is a portion of the valve seat portion 31 on the axially rear surface side. The body portion 31b is contained in the decreased diameter portion 24b of the valve seat containing portion 24. The body portion 31b has a shape with a diameter smaller than a diameter of the collar portion 31a. The body portion 31b has a columnar shape corresponding to the decreased diameter portion 24b of the valve seat containing portion 24. The body portion 31b has a columnar shape corresponding to the decreased diameter portion 24b of the valve seat containing portion 24. A male screw portion corresponding to the female screw portion of the decreased diameter portion 24b of the valve seat containing portion 24 is provided on the side surface of the body portion 31b. By fastening the body portion 31b to the decreased diameter portion 24b, the valve seat portion 31 is fixed relative to the valve seat containing portion 24.

The through hole 32 is a hole penetrating the valve seat portion 31 in the axial direction. The through hole 32 defines an oil passage through which oil is allowed to flow. The through hole 32 has a circular shape as seen in the axial direction. The through hole 32 has a shape such that the portion in the collar portion 31a has a diameter larger than a diameter of the portion formed in the body portion 31*b*. The through hole 32 includes a valve disc receiving portion 32*a*.

The valve disc receiving portion 32*a* is structured to receive the valve disc portion 33, which will be described later. The valve disc receiving portion 32*a* defines an end portion of the through hole 32 on the axially rear surface side and opens in the rear surface of the body portion 31*b*. The valve disc receiving portion 32*a* has a circular truncated cone shape that increases in diameter toward the axially rear surface side. That is, the inner peripheral surface of the valve disc receiving portion 32*a* has a shape of an inclined surface (tapered surface) that increases in diameter toward the axially rear surface side. The illustrated example shows an example where the inclination angle of the inner peripheral surface of the valve disc receiving portion 32*a* with respect to the axial line of the piston 14 is substantially 60 degrees.

The valve disc portion 33 is capable of closing the valve disc receiving portion 32*a*. The valve disc portion 33 is slidable inside the valve disc containing portion 25. The valve disc portion 33 includes a spherical portion 34 and a retaining portion 35.

The spherical portion 34 has a spherical shape. A general steel sphere (ball) can be used as the spherical portion 34. The outer diameter dimension of the spherical portion 34 is preferably substantially the same as the inner diameter dimension of the valve disc containing portion 25 (slightly smaller than the inner diameter dimension of the valve disc containing portion 25). The spherical portion 34 can close the valve disc receiving portion 32*a* by contacting the inclined surface of the valve disc receiving portion 32*a*.

The retaining portion 35 retains the spherical portion 34. The retaining portion 35 is disposed on the axially rear surface side relative to the spherical portion 34. The retaining portion 35 includes a body portion 36 and an engagement portion 37.

The body portion 36 is a portion of the retaining portion 35 on the axially front surface side. The body portion 36 has a columnar shape. The outer diameter dimension of the body portion 36 is preferably substantially the same as the inner diameter dimension of the valve disc containing portion 25 (slightly smaller than the inner diameter dimension of the valve disc containing portion 25). The body portion 36 includes a recess 36*a*.

The recess 36*a* is a portion that opens in the front surface of the body portion 36 and is recessed toward the axially rear surface side. The recess 36*a* has a conical shape that increases in diameter toward the axially front surface side. That is, the inner peripheral surface of the recess 36*a* has a shape of an inclined surface (tapered surface) that increases in diameter toward the axially front surface side. The illustrated example shows an example where the inclination angle of the inner peripheral surface of the recess 36*a* with respect to the axial line of the piston 14 is substantially 60 degrees. The spherical portion 34 contacts the inclined surface of the recess 36*a*, and thus the spherical portion 34 is retained such that its movement in the radial direction is reduced or prevented.

The engagement portion 37 is a portion of the retaining portion 35 on the axially rear surface side. The engagement portion 37 engages with the biasing portion 38, which will be described later. The engagement portion 37 protrudes from the rear surface of the body portion 36 toward the axially rear surface side.

The biasing portion 38 biases the valve disc portion 33 toward the axially front surface side. The biasing portion 38 is disposed on the axially rear surface side relative to the valve disc portion 33 inside the valve disc containing portion 25. The biasing portion 38 is a coil spring capable of extending and contracting in the axial direction. The outer diameter dimension of the biasing portion 38 is preferably substantially the same as the inner diameter dimension of the valve disc containing portion 25 (slightly smaller than the inner diameter dimension of the valve disc containing portion 25). An end portion of the biasing portion 38 on the axially front surface side is fitted to the engagement portion 37 of the retaining portion 35. An end portion of the biasing portion 38 on the axially rear surface side contacts the bottom surface (surface facing frontward) of the valve disc containing portion 25.

As shown in FIG. 7, when the biasing portion 38 is extended, the spherical portion 34 biased via the retaining portion 35 closes the valve disc receiving portion 32*a*. The biasing portion 38 is capable of contracting by receiving the hydraulic pressure inside the hydraulic chamber R via the spherical portion 34 and the retaining portion 35. The biasing force of the biasing portion 38 is set such that it contracts when the hydraulic pressure inside the hydraulic chamber R becomes greater than or equal to a predetermined value.

FIG. 8 shows a case where the hydraulic pressure inside the hydraulic chamber R is greater than or equal to the predetermined value. In this state, the hydraulic pressure applied to the valve disc portion 33 (the spherical portion 34) via the through hole 32 is larger than the biasing force of the biasing portion 38. In this manner, the valve disc portion 33 moves toward the axially rear surface side against the biasing force of the biasing portion 38, so that the valve disc receiving portion 32*a* is opened.

The piston rod 40 shown in FIGS. 2 and 3 transmits the sliding movement of the piston 14 to the lift arm 43, which will be described later. The piston rod 40 has a columnar shape that is longer in the front-rear direction. The piston rod 40 has a distal end portion (front end portion) received by the rod retaining portion 16 of the piston 14. The piston rod 40 has a front end surface having a curved-surface shape, and the front end surface contacts the bottom portion 19 of the rod retaining portion 16. The piston rod 40 has a base end portion (rear end portion) rotatably connected to the interlocked arm 41, which will be described later.

In the present preferred embodiment, since the circular truncated cone portion 17 is provided to the rod retaining portion 16 as described above, the distal end portion of the piston rod 40 can be easily guided toward the bottom portion 19. In addition, since the columnar portion 18 is provided to the rod retaining portion 16, a sufficient depth dimension of the rod retaining portion 16 can be obtained, and the distal end portion of the piston rod 40 can be easily retained.

The interlocked arm 41 connects the piston rod 40 and the lift arm 43, which will be described later. A first rotation shaft 42 is provided at the distal end portion (front end portion) of the interlocked arm 41 and disposed such that its axial direction is in the left-right direction. The interlocked arm 41 is rotatably connected to the base end portion of the piston rod 40 via the first rotation shaft 42. The interlocked arm 41 has a base end portion (rear end portion) rotatably and integrally connected to the lift arm 43, which will be described later.

The lift arm 43 is supported to be rotatable relative to the cylinder case 11. The lift arm 43 is provided such that its distal end portion (rear end portion) protrudes rearward. A second rotation shaft 44 is provided at the base end portion (front end portion) of the lift arm 43 and disposed such that its axial direction is in the left-right direction. The lift arm 43 is supported to be rotatable upward and downward relative to the cylinder case 11 via the second rotation shaft 44. The lift arm 43 is non-rotatably fixed to the base end portion of the interlocked arm 41 via the second rotation shaft 44. The lift arm 43 is displaceable to a predetermined position between a position at which it is lifted most as shown in FIG. 2 (hereinafter referred to as a "lifted position") and a position at which it is lowered most as shown in FIG. 3 (hereinafter referred to as a "lowered position") by rotating about the second rotation shaft 44.

The link mechanism 45 shown in FIG. 1 is rotatably connected to the distal end portion of the lift arm 43. When the lift arm 43 is lifted, the link mechanism 45 lifts the rotary tilling device 50. When the lift arm 43 is lowered, the link mechanism 45 lowers the rotary tilling device 50.

The following will describe rotating motion of the lift arm 43 in the lift arm lifting and lowering mechanism 10 configured as described above.

First, force applied to the lift arm lifting and lowering mechanism 10 will be described. Due to the self-weight of the lift arm 43 and the weight of the rotary tilling device 50 connected to the lift arm 43 (hereinafter referred to as "the self-weight of the lift arm 43 and the like"), the lift arm 43 undergoes a force to rotate it about the second rotation shaft 44 in the clockwise direction as seen in a side view (moment of force in the clockwise direction as seen in a side view). The force presses the piston 14 toward the axially front surface side via the interlocked arm 41 and the piston rod 40.

When the lift arm 43 is at the lowered position as shown in FIG. 2, the front surface of the piston 14 pressed toward the axially front surface side as described above contacts the bottom surface of the cylinder portion 12.

The following will describe, as an example of rotating motion to lift the lift arm 43, rotating motion in which the lift arm 43 at the lowered position as shown in FIG. 2 is moved to the lifted position as shown in FIG. 3.

First, a switching valve provided to the oil feed passage 13 is switched to the state where oil can be fed to the cylinder portion 12. In this manner, oil from the transmission case 7 is fed to the hydraulic chamber R inside the cylinder portion 12 via the oil pump.

The oil fed to the hydraulic chamber R first flows into the space defined by the bottom surface of the cylinder portion 12 and the recess 15 of the piston 14. In this state, when further oil is fed, the hydraulic pressure of the oil presses the recess 15 of the piston 14. In this manner, the piston 14 slides toward the axially rear surface side inside the cylinder portion 12 against the force due to the self-weight of the lift arm 43 and the like.

In association with the sliding movement of the piston 14, the piston rod 40 is pressed toward the axially rear surface side. In this manner, the interlocked arm 41 rotates about the second rotation shaft 44 in the counterclockwise direction as seen in a side view. Accordingly, the lift arm 43 non-rotatably fixed to the interlocked arm 41 rotates in the counterclockwise direction as seen in a side view. The lift arm 43 rotates to a predetermined position in the counterclockwise direction as seen in a side view to reach the lifted position as shown in FIG. 3.

When the lift arm 43 is at the lifted position, the switching valve is switched to the state where the oil feed passage 13 is closed. In this manner, the state where the lift arm 43 is at the lifted position and the rotary tilling device 50 is lifted can be retained.

Next, as an example of rotating motion to lower the lift arm 43, rotating motion in which the lift arm 43 at the lifted position as shown in FIG. 3 is moved to the lowered position as shown in FIG. 2 will be described.

First, the switching valve is switched to the state where oil can be discharged from the cylinder portion 12. In this state, the oil inside the hydraulic chamber R is discharged via the oil feed passage 13, and the piston 14 is pressed by the piston rod 40 by the force due to the self-weight of the lift arm 43 and the like and slides toward the axially front surface side. In this manner, the lift arm 43 rotates in the clockwise direction as seen in a side view. The lift arm 43 rotates to a predetermined position to reach the lowered position as shown in FIG. 2.

When the lift arm 43 is at the lowered position, the switching valve is switched to the state where the oil feed passage 13 is closed. In this manner, the state where the lift arm 43 is at the lowered position and the rotary tilling device 50 is lowered can be retained.

The following will describe operation of the safety valve 30 when the lift arm 43 is at the lifted position.

FIG. 7 shows a case where the hydraulic pressure inside the hydraulic chamber R is less than the predetermined value. In this state, the biasing force of the biasing portion 38 is larger than the hydraulic pressure applied to the valve disc portion 33 (the spherical portion 34 and the retaining portion 35) via the through hole 32. In this manner, the valve disc portion 33 (the spherical portion 34) biased by the biasing portion 38 closes the valve disc receiving portion 32a.

FIG. 8 shows a case where the hydraulic pressure inside the hydraulic chamber R is greater than or equal to the predetermined value. In this state, the hydraulic pressure applied to the valve disc portion 33 (the spherical portion 34) via the through hole 32 is larger than the biasing force of the biasing portion 38. In this manner, the valve disc portion 33 moves toward the axially rear surface side by the hydraulic pressure inside the hydraulic chamber R against the biasing force of the biasing portion 38, so that the valve disc receiving portion 32a is opened.

When the valve disc receiving portion 32a is opened, the oil inside the hydraulic chamber R can flow through the oil passage 22. That is, when the valve disc receiving portion 32a is opened, the oil flowing through the through hole 32 is fed into the valve disc containing portion 25 of the containing portion 23. The oil fed into the valve disc containing portion 25 flows through the gap between the inner surface of the valve disc containing portion 25 and the spherical portion 34 and the side surface of the body portion 36 of the retaining portion 35 toward the axially rear surface side, as shown in FIG. 8. In this manner, the oil inside the hydraulic chamber R can be discharged from the rear surface of the piston 14.

Since the safety valve 30 as described above is provided, it is possible to reduce or prevent an excessive rise in the hydraulic pressure inside the hydraulic chamber R. In particular, the hydraulic pressure inside the hydraulic chamber R may excessively rise under certain conditions. Specifically, when a load is applied to the lifted rotary tilling device 50, a force is applied to rotate the lift arm 43 at the lifted position in the clockwise direction as seen in a side view, and the piston 14 is pressed toward the axially front surface side, so that the hydraulic pressure inside of the hydraulic chamber R may excessively rise. In addition, when the temperature of the oil inside the hydraulic chamber R rises, the volume of the oil may increase and thus the hydraulic pressure may excessively rise. In various preferred embodiments of the present invention, since the safety valve 30 as described above is provided, the hydraulic pressure inside the hydraulic chamber R is decreased when the hydraulic pressure inside the hydraulic chamber R becomes greater than or equal to the predetermined value, and thus it is possible to reduce or prevent an excessive rise in the hydraulic pressure.

In addition, since the safety valve 30 is contained in the piston 14, it is possible to reduce or prevent an increase in the size of the cylinder case 11, unlike the case where the safety valve 30 is provided to the cylinder case 11.

In addition, although the safety valve 30 is pushed by the hydraulic pressure of the hydraulic chamber R toward the axially rear surface side, the non-containing portion 26 is provided on the axially rear surface side relative to the containing portion 23, and thus the movement of the safety valve 30 beyond the non-containing portion 26 toward the axially rear surface is restricted. In this manner, it is possible to prevent the safety valve 30 pressed by the hydraulic pressure from coming off piston 14 from the axially rear surface.

In addition, in the present preferred embodiment, oil discharged from the rear surface of the piston 14 is fed into the transmission case 7 via an opening at a lower portion of the cylinder case 11. Thus, it is possible to eliminate the necessity to provide an oil passage to return the discharged oil to the transmission case 7 and simplify the configuration.

In addition, in the present preferred embodiment, since the valve disc containing portion 25 has a shape with a diameter smaller than a diameter of the valve seat containing portion 24 and the valve disc portion 33 and the biasing portion 38 are contained in the valve disc containing portion 25, it is possible to stabilize the valve disc portion 33 and the biasing portion 38 (suppress the wobbling thereof) when the valve disc portion 33 and the biasing portion 38 receive pressure. In this manner, it is possible to reduce or prevent an occurrence of failure of the safety valve 30 in operating at a predetermined pressure and variation in the pressure for operating the safety valve 30.

As described above, the lift arm lifting and lowering mechanism 10 according to the present preferred embodiment includes the cylinder case 11 provided with the cylinder portion 12 into which oil is fed; the piston 14 slidably provided inside the cylinder portion 12 to define the hydraulic chamber R and receiving hydraulic pressure of the hydraulic chamber R on the front surface (first surface); the safety valve 30 provided to the piston 14 to discharge the oil inside the hydraulic chamber R to the outside when the hydraulic pressure of the hydraulic chamber R becomes greater than or equal to a predetermined value; and the lift arm 43 supported by the cylinder case 11 and rotatable in conjunction with movement of the piston 14, in which the piston 14 includes the oil passage 22 allowing communication between the rear surface (second surface) of the piston 14 and the front surface, and the oil passage 22 includes the containing portion 23 provided to open on the axially front surface side (first surface side) and capable of containing the safety valve 30; and the non-containing portion 26 provided on the axially rear surface side (second surface side) relative to the containing portion 23 and incapable of containing the safety valve 30.

In this configuration, it is possible to reduce or prevent an excessive rise in the hydraulic pressure inside the hydraulic chamber R. That is, when the hydraulic pressure inside the hydraulic chamber R becomes greater than or equal to the predetermined value, the oil inside the hydraulic chamber R is discharged to the outside by the safety valve 30 provided to the piston 14, so that the pressure inside the hydraulic chamber R can be decreased. In addition, since the piston 14 is provided to the safety valve 30, the attachment of the safety valve 30 can be made relatively easy. In addition, since the containing portion 23 is provided to open on one end side (axially front surface side) of the oil passage 22 and the non-containing portion 26 is provided on the other end side (axially rear surface side), it is possible to prevent the safety valve 30 pressed by hydraulic pressure from coming off the piston 14 from the axially rear surface side.

In addition, the safety valve 30 includes the valve seat portion 31 fixed inside the containing portion 23 and including the through hole 32 through which the oil is allowed to flow; the valve disc portion 33 movable inside the containing portion 23 and capable of closing the through hole 32 by contacting the valve seat portion 31 from the axially rear surface side; and the biasing portion 38 biasing the valve disc portion 33 toward the axially front surface side.

In this configuration, the structure of the safety valve 30 can be simplified. That is, the structure of the safety valve 30 can be simplified as compared to a control valve using electric power.

In addition, the containing portion 23 includes the valve seat containing portion 24 containing the valve seat portion 31; and the valve disc containing portion 25 that is continuous with the valve seat containing portion 24 and has a shape with a diameter smaller than a diameter of the valve seat containing portion 24 and containing the valve disc portion 33.

In this configuration, it is possible to stabilize the valve disc portion 33 when the valve disc portion 33 receives pressure.

In addition, the through hole 32 includes the valve disc receiving portion 32a provided at the end portion of the valve seat portion 31 on the axially rear surface side and having a circular truncated cone shape that increases in diameter toward the axially rear surface side, and the valve disc portion 33 includes the spherical portion 34 with a spherical shape capable of closing the valve disc receiving portion 32a; and the retaining portion 35 engaging with the biasing portion 38 and retaining the spherical portion 34.

In this configuration, the structure of the safety valve 30 can be made relatively simple.

That is, the general spherical portion 34 can be used to close the valve disc receiving portion 32a regardless of the inclination angle (taper angle) of the inner peripheral surface of the valve disc receiving portion 32a, and thus the structure of the safety valve 30 can be made relatively simple.

In addition, the lift arm lifting and lowering mechanism 10 further includes the piston rod 40 to transmit sliding movement of the piston 14 to the lift arm 43, in which the piston 14 includes the rod retaining portion 16 provided to open in the rear surface and receiving the piston rod 40, the rod retaining portion 16 includes the circular truncated cone portion 17 continuous with the edge portion of the opening of the rod retaining portion 16 and having a circular truncated cone shape extending to decrease in diameter toward the axially front surface side; the columnar portion 18 continuous with the circular truncated cone portion 17 and having a columnar shape extending in the axial direction of the piston 14; and the bottom portion 19 continuous with the columnar portion 18 and defining a bottom of the rod retaining portion 16.

In this configuration, the rod retaining portion 16 can suitably receive the piston rod 40. That is, since the circular truncated cone portion 17 is provided, the distal end portion of the piston rod 40 can be guided toward the axially front surface side (bottom portion 19 side). In addition, since the columnar portion 18 is provided, it is possible to obtain a sufficient depth dimension of the rod retaining portion 16 and easily retain the distal end portion of the piston rod 40.

In addition, the columnar portion 18 and the containing portion 23 are provided to at least partially overlap each other in the axial direction.

In this configuration, it is possible to easily obtain a certain thickness between the containing portion 23 and the rod retaining portion 16 in the piston 14. Thus, it is possible reduce or prevent the concentration of stress at a partial area between the containing portion 23 and the rod retaining portion 16.

Note that the first surface according to the present preferred embodiment is a form of embodying the front surface according to the present invention.

The second surface according to the present preferred embodiment is a form of embodying the rear surface according to the present invention.

Although the first preferred embodiment of the present invention has been described above, the present invention is not limited to the above-described configuration, and various modifications are possible within the scope of the invention defined in the claims.

Figure 9:
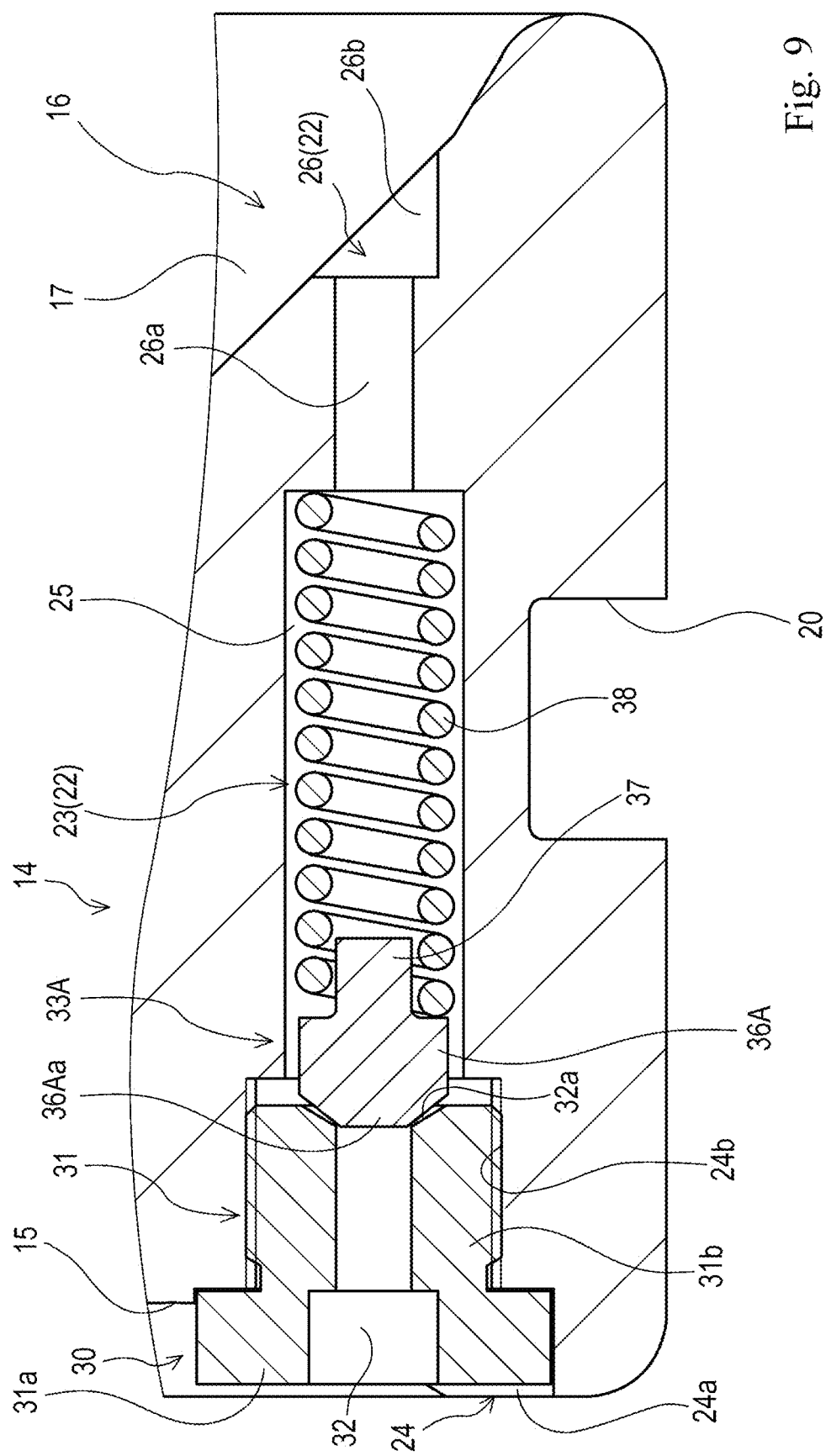
FIG. 9 is an enlarged cross-sectional view showing a safety valve when the hydraulic pressure inside a hydraulic chamber is less than a predetermined value in a lift arm lifting and lowering mechanism according to a second preferred embodiment of the present invention.
Figure 10:
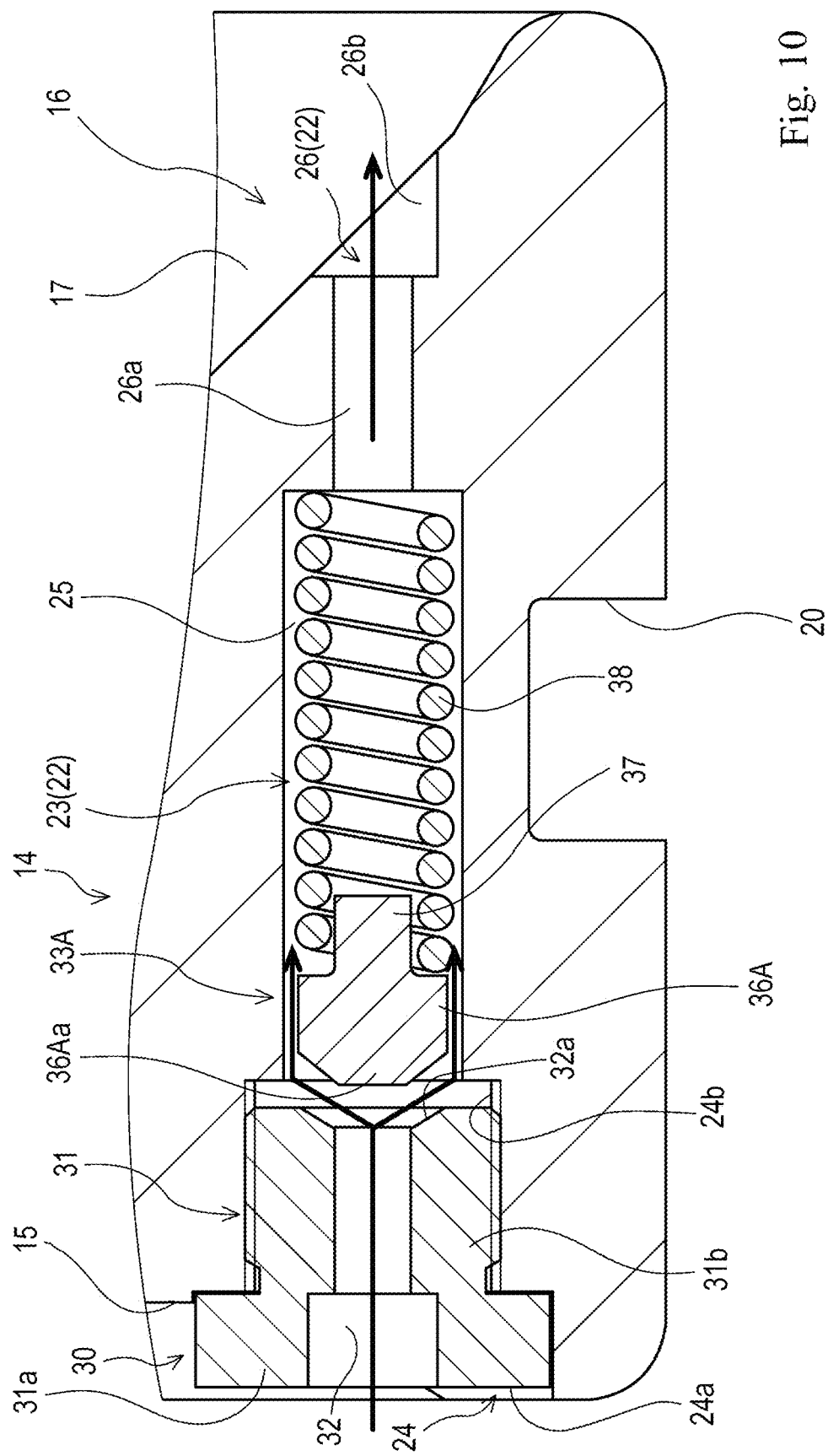
FIG. 10 is an enlarged cross-sectional view showing the safety valve when the hydraulic pressure inside the hydraulic chamber is greater than or equal to the predetermined value in the lift arm lifting and lowering mechanism according to the second preferred embodiment of the present invention.

For example, as in a lift arm lifting and lowering mechanism 10 according to a second preferred embodiment of the present invention as shown in FIGS. 9 and 10, a modification may be made to the structure of a valve disc portion 33A of a safety valve 30. Note that the lift arm lifting and lowering mechanism according to the second preferred embodiment is generally similar to the lift arm lifting and lowering mechanism 10 according to the above-described first preferred embodiment except for the structure of the valve disc portion 33A.

The valve disc portion 33A is different from that in the above-described first preferred embodiment in that a body portion 36A can close the valve disc receiving portion 32*a* without the intervention of the spherical portion 34. The body portion 36A is provided with an engagement portion 37 protruding from the rear surface toward the axially rear surface side in the same way as in the above-described first preferred embodiment. The body portion 36A includes a protruding portion 36Aa.

The protruding portion 36Aa is a portion capable of closing the valve disc receiving portion 32*a*. The protruding portion 36Aa is integrally provided to the body portion 36A so as to protrude toward the axially front surface side on the front surface of the body portion 36A. The protruding portion 36Aa has a circular truncated cone shape that decreases in diameter toward the axially front surface side. That is, the outer peripheral surface of the protruding portion 36Aa has a shape of an inclined surface (tapered surface) that decreases in diameter toward the axially front surface side. The inclination angle of the outer peripheral surface of the protruding portion 36Aa with respect to the axial line is set to be smaller than the inclination angle of the inner peripheral surface of the valve disc receiving portion 32*a* with respect to the axial line. Thus, as shown in FIG. 9, the distal end portion of the protruding portion 36Aa can close the valve disc receiving portion 32*a* by being inserted into the valve disc receiving portion 32*a*. The illustrated example shows an example where the inclination angle of the outer peripheral surface of the protruding portion 36Aa with respect to the axial line in a cross-sectional view is substantially 50 degrees.

As shown in FIG. 10, when the hydraulic pressure in the hydraulic chamber R becomes greater than or equal to a predetermined value, the valve disc portion 33A receives the hydraulic pressure in the hydraulic chamber R at the distal end portion of the protruding portion 36Aa and moves toward the axially rear surface side, so that the valve disc receiving portion 32*a* is opened. In this case, the oil fed into the valve disc containing portion 25 flows through the gap between the inner surface of the valve disc containing portion 25 and the side surface of the body portion 36A toward the axially rear surface side.

As described above, the through hole 32 according to the second preferred embodiment of the present invention includes the valve disc receiving portion 32*a* provided at the end portion of the valve seat portion 31 on the axially rear surface side and having a circular truncated cone shape that increases in diameter toward the axially rear surface side, and the valve disc portion 33 includes the engagement portion 37 engaging with the biasing portion 38; and the protruding portion 36Aa integrally provided to the engagement portion 37 and having a conical shape (circular truncated cone shape) that decreases in diameter toward the axially front surface side to be capable of closing the valve disc receiving portion 32*a*.

In this configuration, the number of components of the safety valve 30 can be reduced.

That is, the number of components can be reduced as compared to the case where a component closing the valve disc receiving portion 32*a* and a component engaging with the biasing portion 38 are separately prepared.

The structure of the safety valve 30 is not limited to those in the above-described preferred embodiments. For example, as in a lift arm lifting and lowering mechanism 10 according to a third preferred embodiment, a modification may be made to the structure of a valve disc portion 33B shown in FIGS. 11A, 11B and 12. Note that the lift arm lifting and lowering mechanism 10 according to the third preferred embodiment is generally similar to the lift arm lifting and lowering mechanism 10 according to the above-described second preferred embodiment except for the structure of the valve disc portion 33B.

The valve disc portion 33B is different from that in the above-described second preferred embodiment in that groove portions 36Bb are provided in the side surface of a body portion 36B. Note that the body portion 36B is provided with a protruding portion 36Ba and an engagement portion 37 in the same way as in the above-described first preferred embodiment.

Figure 11A:
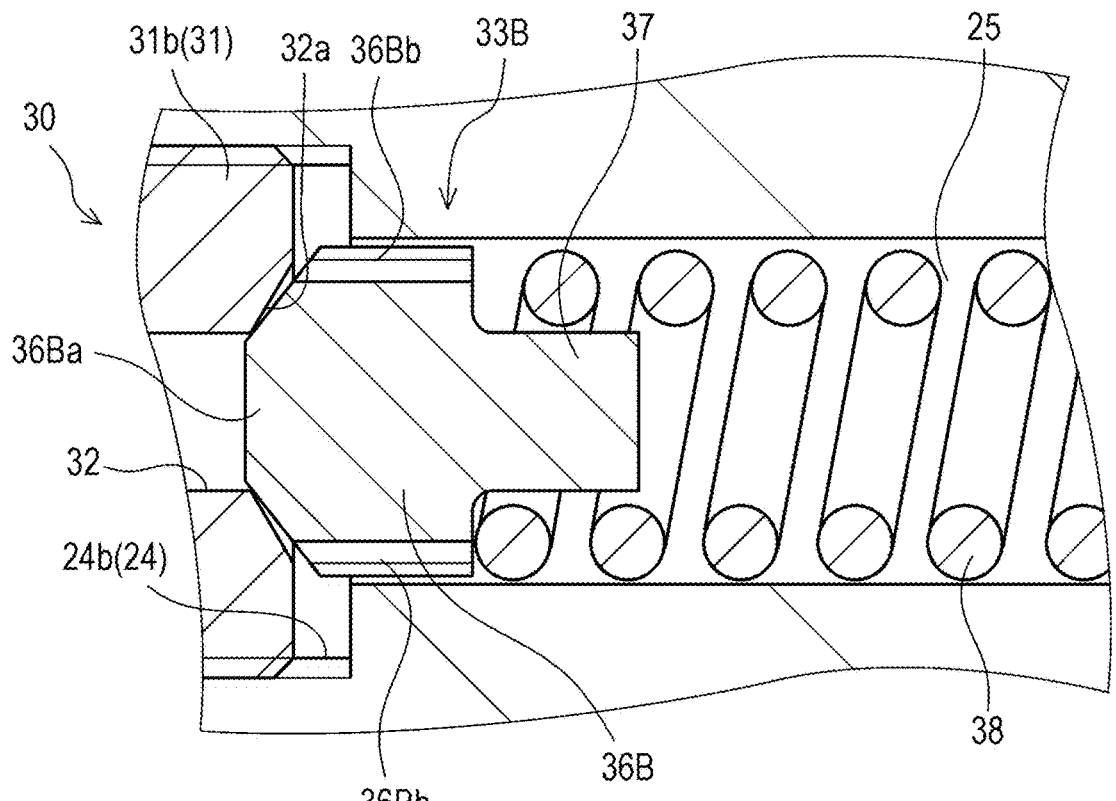
FIG. 11A is an enlarged cross-sectional view showing a safety valve when the hydraulic pressure inside a hydraulic chamber is greater than or equal to a predetermined value in a lift arm lifting and lowering mechanism according to a third preferred embodiment of the present invention.
Figure 11B:
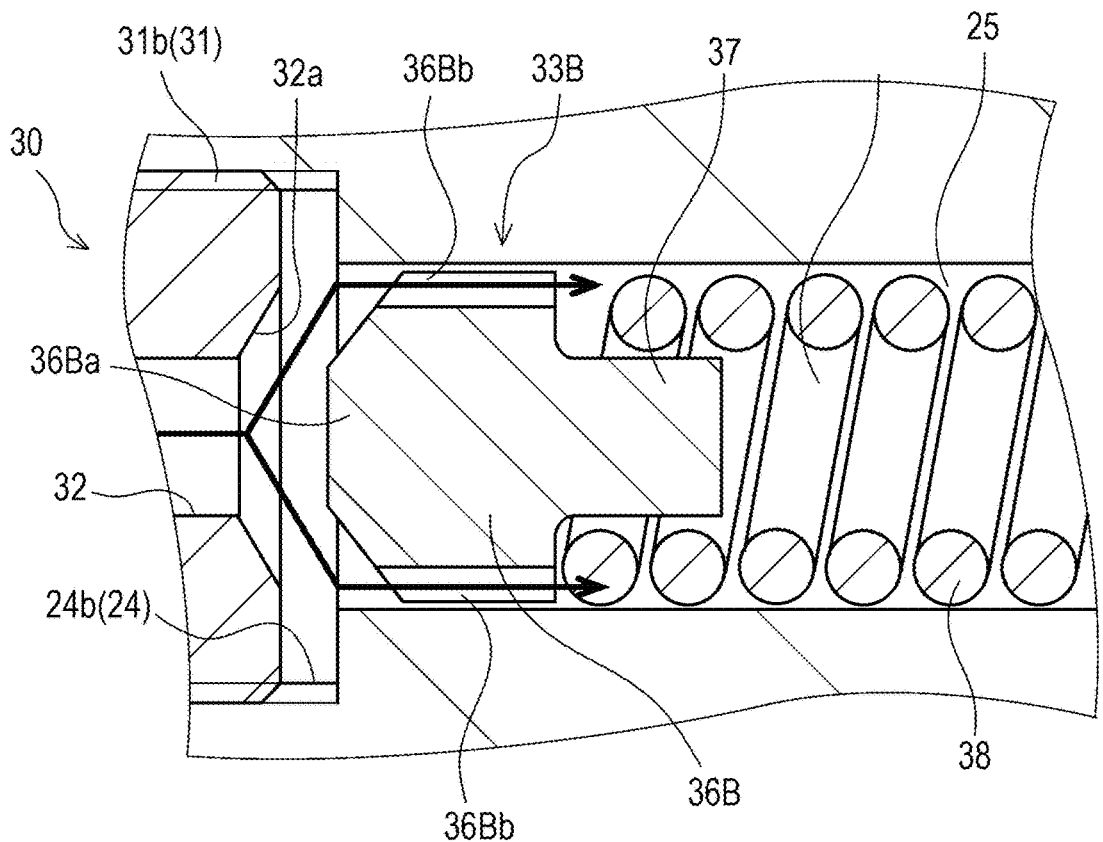
FIG. 11B is an enlarged cross-sectional view showing the safety valve when the hydraulic pressure inside the hydraulic chamber is greater than or equal to the predetermined value in the lift arm lifting and lowering mechanism according to the third preferred embodiment of the present invention.
Figure 12:
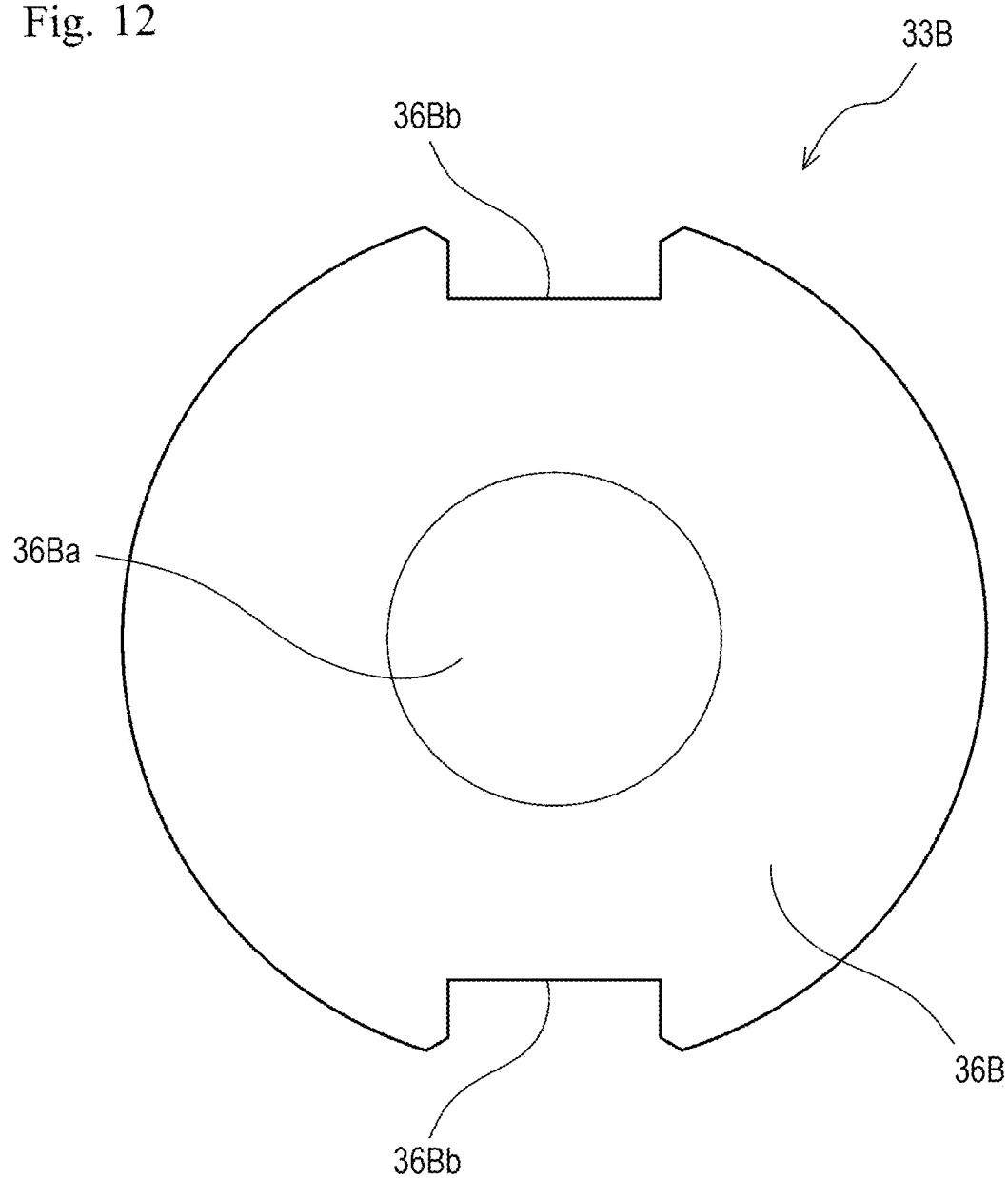
FIG. 12 is a front view showing a valve disc portion in the lift arm lifting and lowering mechanism according to the third preferred embodiment.

The groove portions 36Bb are grooves provided over the entire side surface of the body portion 36B in the axial direction (moving direction). A pair of groove portions 36Bb are provided at upper and lower positions of the body portion 36B as shown in FIGS. 11A, 11B and 12. The portion connecting the groove portion 36Bb and the side surface of the body portion 36B is chamfered.

In the present preferred embodiment, the outer diameter dimension of the body portion 36B is larger than the outer diameter dimension of the body portion 36A in the second preferred embodiment. As a result, the gap between the inner surface of the valve disc containing portion 25 and the side surface of the body portion 36B is made small. In the above configuration, the wobbling of the valve disc portion 33B relative to the valve disc containing portion 25 can be reduced or prevented, and the valve disc portion 33B can be stably moved.

FIG. 11A shows a state where the hydraulic pressure inside the hydraulic chamber R is less than a predetermined value. In this state, the distal end portion of the protruding portion 36Ba can close the valve disc receiving portion 32*a* by being inserted into the valve disc receiving portion 32*a*.

FIG. 11B shows a state where the hydraulic pressure inside the hydraulic chamber R is greater than or equal to the predetermined value. In this state, the valve disc portion 33B receives the hydraulic pressure in the hydraulic chamber R at the distal end portion of the protruding portion 36Ba and moves toward the axially rear surface side, so that the valve disc receiving portion 32a is opened. In this case, although the gap between the inner surface of the valve disc containing portion 25 and the side surface of the body portion 36B is relatively small, the groove portions 36Bb are provided in the side surface, so that a flow path to discharge oil can be provided.

As described above, the valve disc portion 33B according to the third preferred embodiment of the present invention includes the side surface opposed to the inner surface of the containing portion 23, and the side surface has the groove portion 36Bb provided over the entire portion in the moving direction.

In this configuration, a flow path to discharge oil can be provided. That is, even if the gap between the side surface of the valve disc portion 33B and the inner surface of the valve disc containing portion 25 is small, a flow path to discharge oil can be provided.

Note that, although the protruding portion 36Aa and the protruding portion 36Ba have a circular truncated cone shape in the above-described second and third preferred embodiments, the protruding portion 36Aa and the protruding portion 36Ba are not limited to the above-mentioned shape as long as they have a shape that is circular as seen in the axial direction and decreases in diameter toward the axially front surface side (conical shape). For example, the protruding portion 36Aa and the protruding portion 36Ba may have a conical shape. In addition, the protruding portion 36Aa and the protruding portion 36Ba are not limited to a shape in which its generatrix is a straight line as seen in a side view, and may have a shape in which its generatrix is a curved line, for example.

Figure 13:
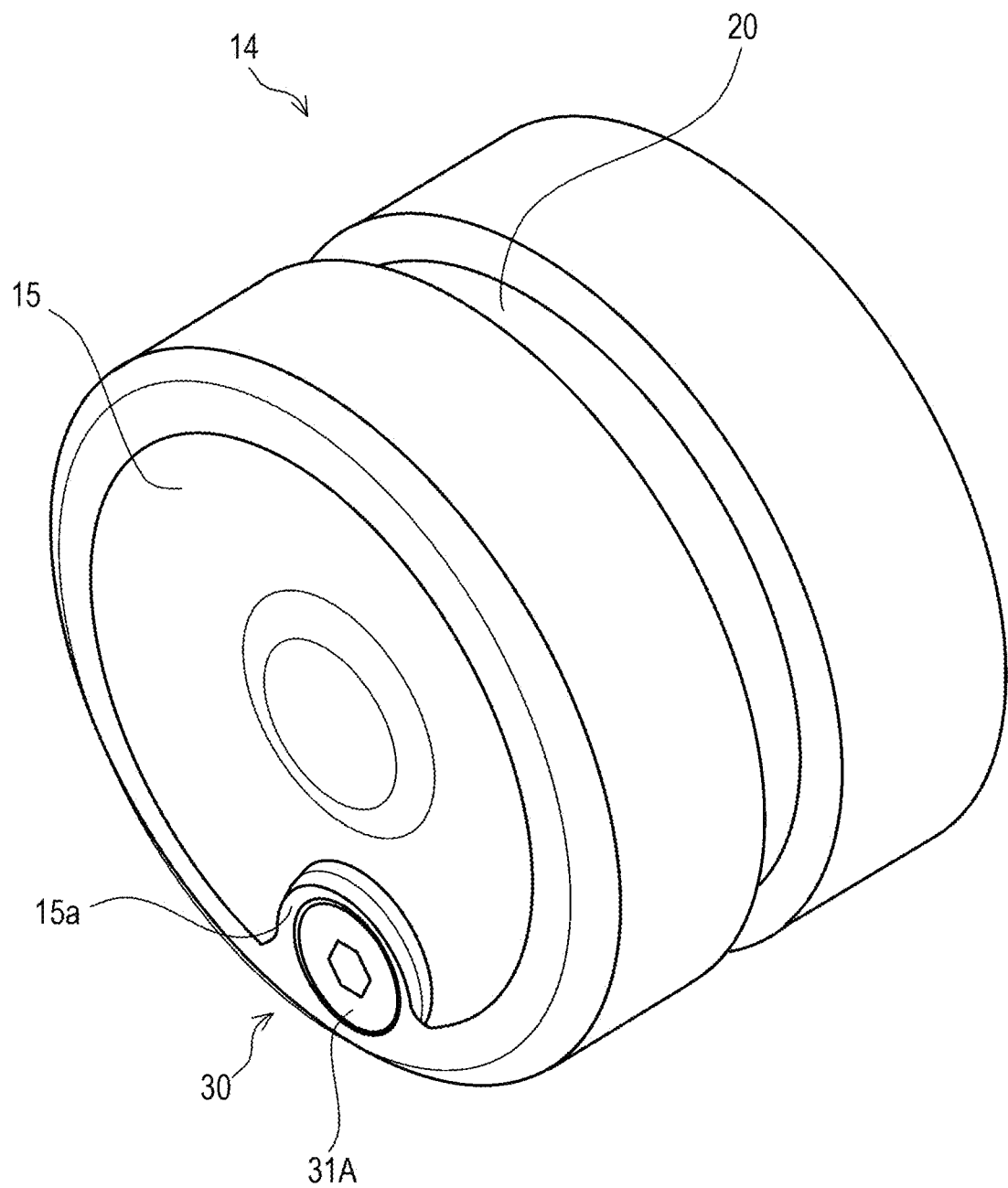
FIG. 13 is a perspective view showing a front surface side of a piston in a lift arm lifting and lowering mechanism according to a fourth preferred embodiment of the present invention.
Figure 14:
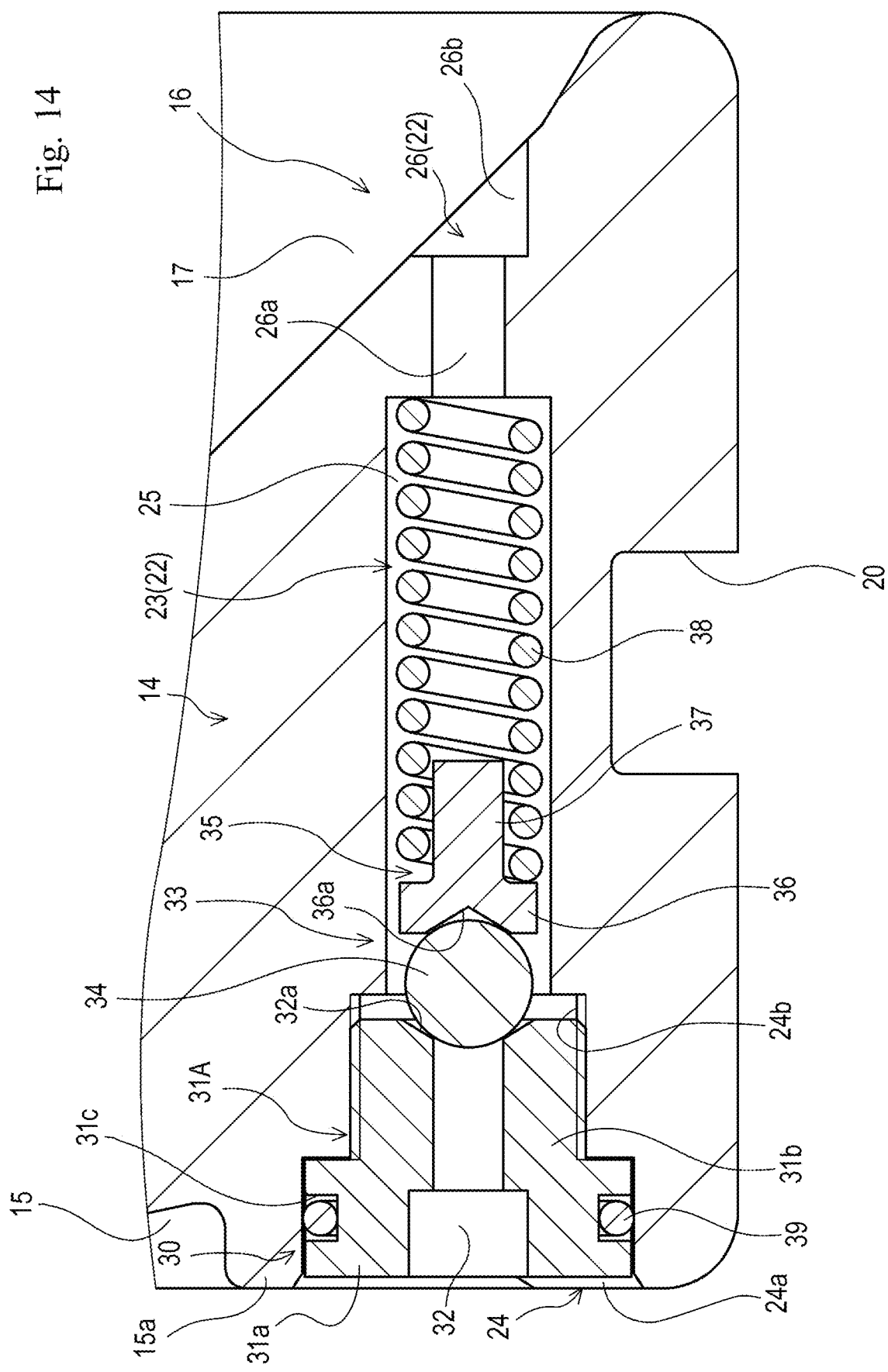
FIG. 14 is an enlarged cross-sectional view showing a safety valve when the hydraulic pressure inside a hydraulic chamber is less than a predetermined value in the lift arm lifting and lowering mechanism according to the fourth preferred embodiment of the present invention.

The structure of the safety valve 30 is not limited to those in the above-described preferred embodiments. For example, as in a lift arm lifting and lowering mechanism 10 according to a fourth preferred embodiment, a modification may be made to the structures of a recess 15 and a valve seat portion 31A of a piston 14 shown in FIGS. 13 and 14. Note that the lift arm lifting and lowering mechanism 10 according to the fourth preferred embodiment is generally similar to the lift arm lifting and lowering mechanism 10 according to the above-described first preferred embodiment except for the structures of the recess 15 and the valve seat portion 31A.

The piston 14 according to the fourth preferred embodiment is different from that in the above-described first preferred embodiment in that a thickening portion 15a is provided at a portion of the recess 15. The thickening portion 15a is a portion formed to fill (thicken) a portion of the recess 15 recessed toward the axially rear surface side on the front surface of the piston 14. The thickening portion 15a is provided at the lower end portion of the recess 15 to protrude from the bottom of the recess 15. The thickening portion 15a has a substantially circular shape as seen in the axial direction. The front surface of the thickening portion 15a is coplanar with the portion of the front surface of the piston 14 where the recess 15 is not provided.

In the present preferred embodiment, the containing portion 23 is provided at the thickening portion 15a. Thus, the entire side surface of the collar portion 31a of the valve seat portion 31A is covered by the increased diameter portion 24a of the valve seat containing portion 24.

A recessed groove 31c is provided in the side surface of the collar portion 31a of the valve seat portion 31A. The recessed groove 31c is provided over the entire periphery of the side surface of the collar portion 31a. The recessed groove 31c has a rectangular shape as seen in a cross-sectional view.

In the present preferred embodiment, an O-ring 39 is fitted into the recessed groove 31c. The O-ring 39 is an annular member capable of sealing oil. The O-ring 39 contacts the bottom surface of the recessed groove 31c and the inner peripheral surface of the increased diameter portion 24a of the valve seat containing portion 24. Thus, the sealing property of the valve seat portion 31A against the valve seat containing portion 24 can be improved.

As described above, the piston 14 according to the fourth preferred embodiment of the present invention includes the recess 15 provided to open in the front surface; and the thickening portion 15a provided to protrude from a bottom of the recess 15, and the containing portion 23 is provided at the thickening portion 15a.

In this configuration, the exposure of the safety valve 30 from the recess 15 is reduced or prevented. Thus, the safety valve 30 can be easily retained with respect to the piston 14. In addition, the portion where the containing portion 23 is provided and thus reduced in weight can be thickened, so that an imbalance in weight of the piston 14 is reduced or prevented.

Figure 15:
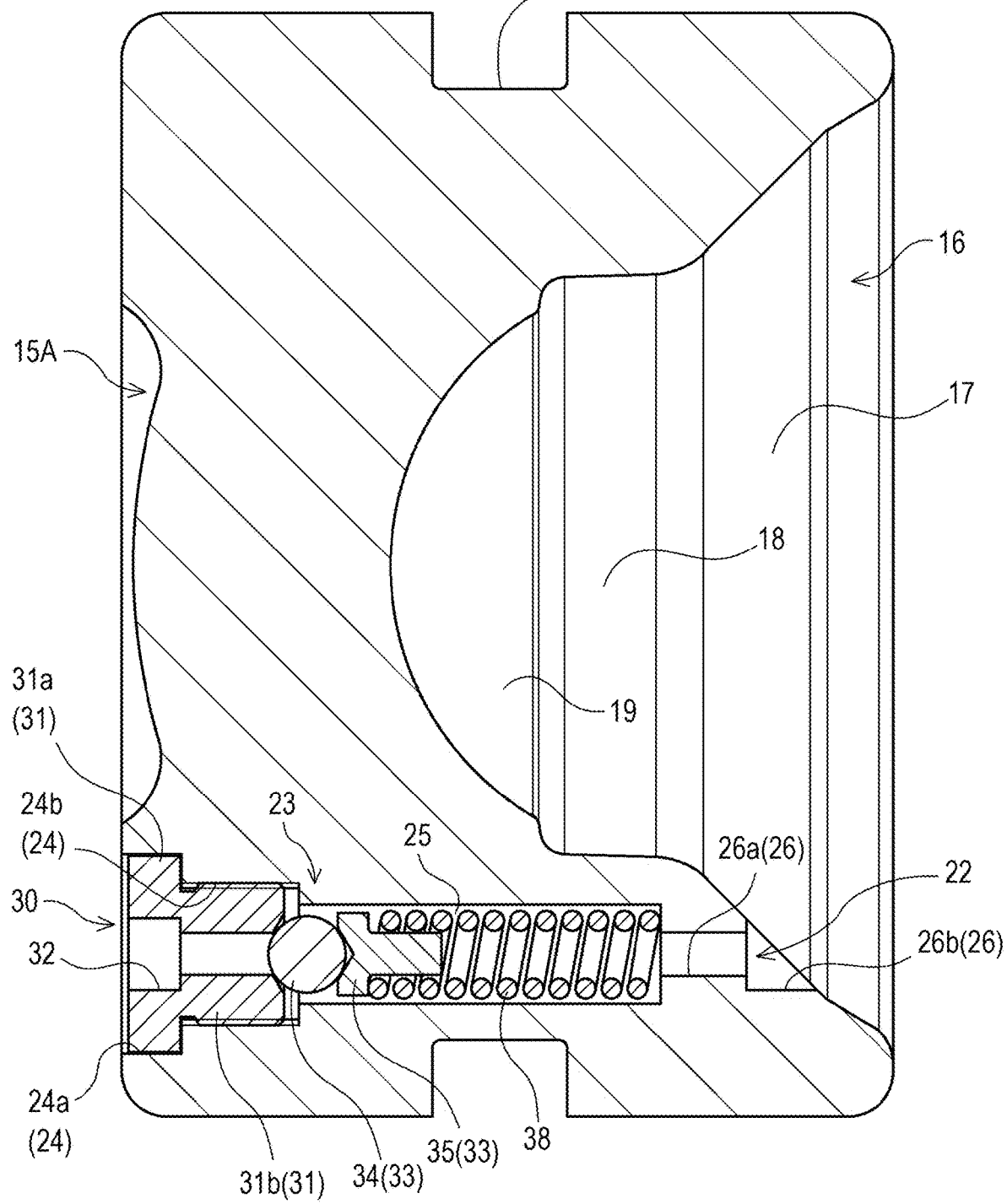
FIG. 15 is a cross-sectional view showing a piston in a lift arm lifting and lowering mechanism according to a fifth preferred embodiment of the present invention.
Figure 17:
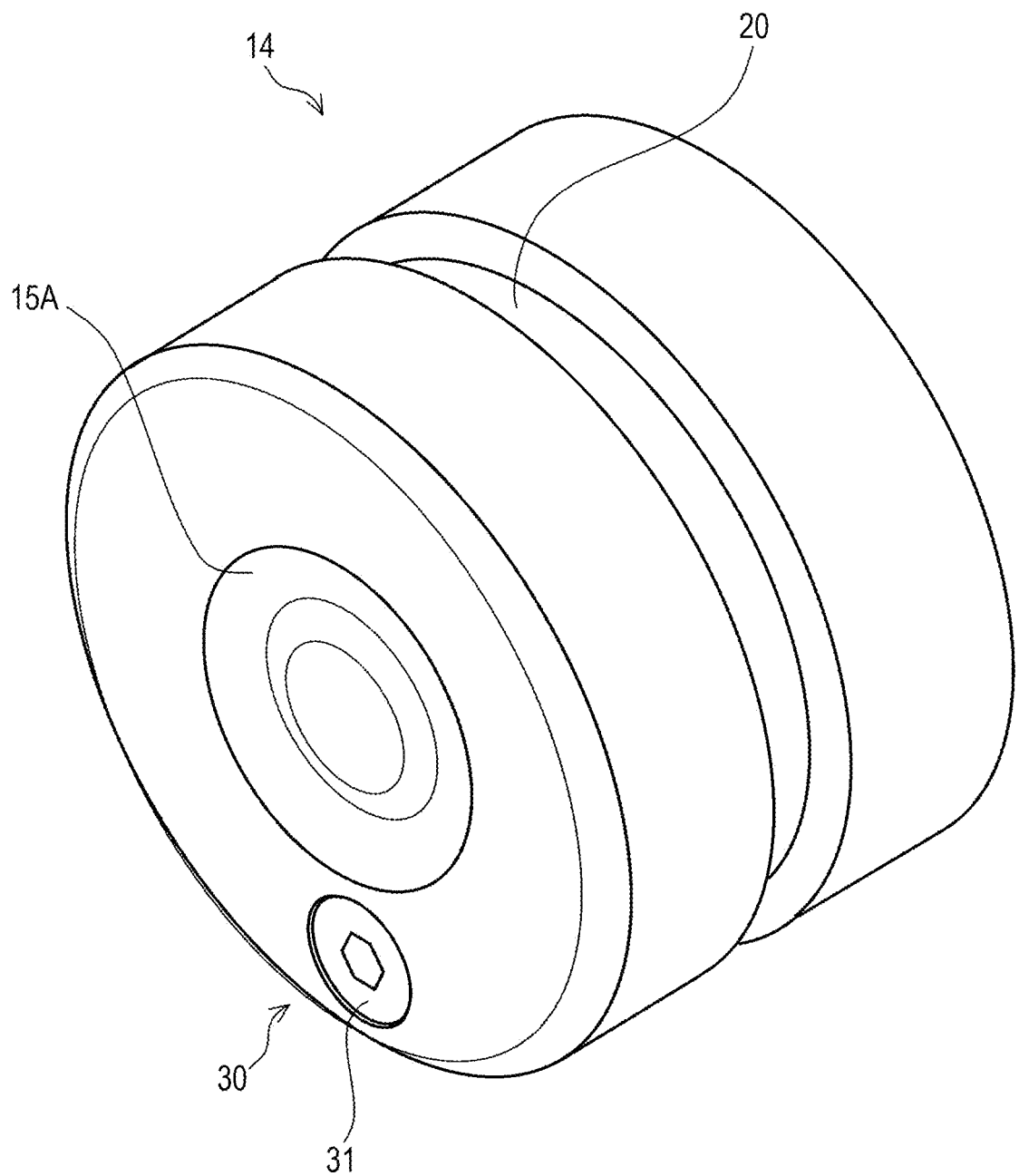
FIG. 17 is a perspective view showing a front surface side of a piston in the lift arm lifting and lowering mechanism according to the fifth preferred embodiment of the present invention.

In addition, as in a lift arm lifting and lowering mechanism 10 according to a fifth preferred embodiment of the present invention, a modification may be made to the structure of a recess 15A a piston 14 shown in FIGS. 15 and 17 in the structure of the safety valve 30, for example. Note that the lift arm lifting and lowering mechanism 10 according to the fifth preferred embodiment is generally similar to the lift arm lifting and lowering mechanism 10 according to the above-described first preferred embodiment except for the structure of the recess 15A.

Figure 16:
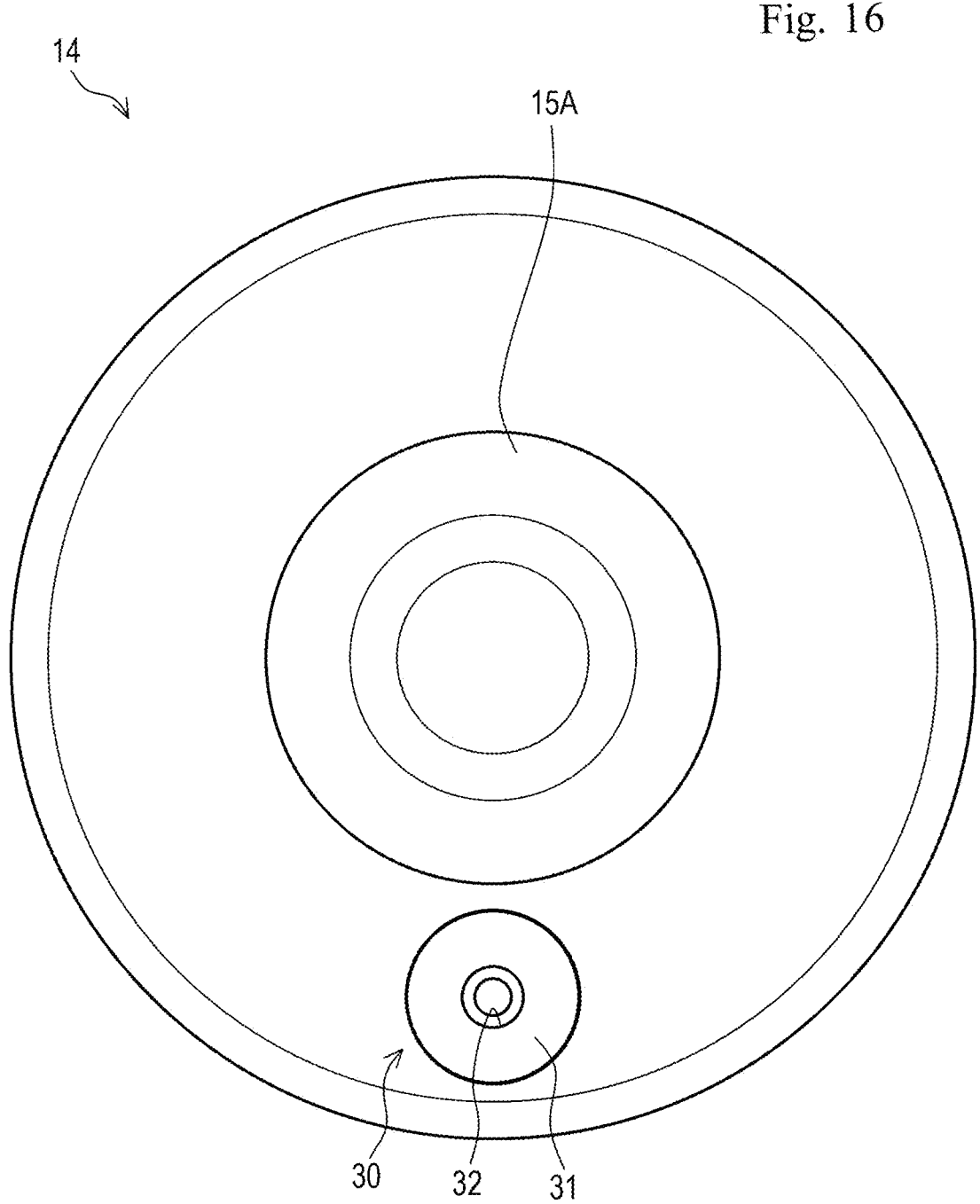
FIG. 16 is a front view showing the piston in the lift arm lifting and lowering mechanism according to the fifth preferred embodiment of the present invention.

The recess 15A according to the fifth preferred embodiment is different from that in the above-described first preferred embodiment in that it is smaller than the recess 15 according to the first preferred embodiment. Specifically, the recess 15A preferably has a circular shape having a size that does not overlap the containing portion 23 of the oil passage 22 as seen in the axial direction (see FIG. 16). In other words, the containing portion 23 is located outside the recess 15A (in the radial direction) as seen in the axial direction. Thus, the recess 15A is provided so as not to communicate with the containing portion 23.

As described above, the piston 14 according to the fourth preferred embodiment of the present invention includes the recess 15A provided to open in the front surface, and the containing portion 23 is provided outside the recess 15A.

In this configuration, the exposure of the safety valve 30 from the recess 15 is able to be reduced or prevented. Thus, the safety valve 30 can be easily retained with respect to the piston 14. In addition, the formation of the recess 15A can be simplified as compared to the case where the thickening portion 15a is provided as in the fourth preferred embodiment.

Note that, although the recess 15 is provided in the front surface of the piston 14 in the above-described preferred embodiments, there is no limitation thereto. For example, the recess 15 may not be provided in the front surface of the piston 14 and the front surface may be a flat surface. In this case, a recess may be provided in the bottom surface of the cylinder portion 12 to define an appropriate space with the front surface of the piston 14.

In addition, the structure of the rod retaining portion 16 of the piston 14 is not limited to the manners in the above-described preferred embodiments and various manners may be used. That is, the disposal and shapes of the circular truncated cone portion 17, the columnar portion 18, and the bottom portion 19 of the rod retaining portion 16 may be appropriately set from the viewpoint of suitably retaining the piston rod 40 and the viewpoint of obtaining a sufficient thickness between it and the oil passage 22.

In addition, the structure of safety valve 30 is not limited to the manners in the above-described preferred embodiments and various manners may be used. For example, the safety valve 30 is not limited to the manner that biases the valve disc portion 33 against the valve seat portion 31, and a control valve using electric power may be used.

In addition, although the tractor 1 is shown as an example of the working vehicle provided with the lift arm lifting and lowering mechanism 10 in the above-described preferred embodiments, there is no limitation thereto. For example, the working vehicle may be another agricultural vehicle, construction vehicle, industrial vehicle, or the like.

Preferred embodiments of the present invention can be applied to a lift arm lifting and lowering mechanism.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lift arm lifting and lowering mechanism comprising:
a cylinder case provided with a cylinder portion into which oil is fed;
a piston slidably provided inside the cylinder portion to define a hydraulic chamber and to receive hydraulic pressure of the hydraulic chamber on a first surface;
a safety valve provided to the piston to discharge oil from the hydraulic chamber when the hydraulic pressure of the hydraulic chamber becomes greater than or equal to a predetermined value;
a lift arm supported by the cylinder case and rotatable in conjunction with movement of the piston; and
a piston rod to transmit sliding movement of the piston to the lift arm; wherein
the piston includes an oil passage allowing communication between a second surface of the piston and the first surface of the piston;
the oil passage includes:
 a containing portion provided to open on the first surface side and capable of containing the safety valve; and
 a non-containing portion provided on the second surface side relative to the containing portion and incapable of containing the safety valve;
the piston includes a rod retaining portion provided to open in the second surface and receiving the piston rod;
the rod retaining portion includes:
 a circular truncated cone portion continuous with an edge portion of the opening of the rod retaining portion and having a circular truncated cone shape extending to decrease in diameter toward the first surface side;
 a columnar portion continuous with the circular truncated cone portion and having a columnar shape extending in an axial direction of the piston; and
 a bottom portion continuous with the columnar portion and defining a bottom of the rod retaining portion; and
the columnar portion and the containing portion are provided side by side so as to at least partially overlap each other in the axial direction.

2. A lift arm lifting and lowering mechanism comprising:
a cylinder case provided with a cylinder portion into which oil is fed;
a piston slidably provided inside the cylinder portion to define a hydraulic chamber and to receive hydraulic pressure of the hydraulic chamber on a first surface;
a safety valve provided to the piston to discharge oil from the hydraulic chamber when the hydraulic pressure of the hydraulic chamber becomes greater than or equal to a predetermined value; and
a lift arm supported by the cylinder case and rotatable in conjunction with movement of the piston; wherein
the piston includes an oil passage allowing communication between a second surface of the piston and the first surface of the piston;
the oil passage includes:
 a containing portion provided to open on the first surface side and capable of containing the safety valve; and
 a non-containing portion provided on the second surface side relative to the containing portion and incapable of containing the safety valve;
the piston includes a recess provided to open in the first surface; and
the containing portion is provided outside the recess.

3. A lift arm lifting and lowering mechanism comprising:
a cylinder case provided with a cylinder portion into which oil is fed;
a piston slidably provided inside the cylinder portion to define a hydraulic chamber and to receive hydraulic pressure of the hydraulic chamber on a first surface;
a safety valve provided to the piston to discharge oil from the hydraulic chamber when the hydraulic pressure of the hydraulic chamber becomes greater than or equal to a predetermined value; and
a lift arm supported by the cylinder case and rotatable in conjunction with movement of the piston; wherein
the piston includes an oil passage allowing communication between a second surface of the piston and the first surface of the piston;
the oil passage includes:
 a containing portion provided to open on the first surface side and capable of containing the safety valve; and
 a non-containing portion provided on the second surface side relative to the containing portion and incapable of containing the safety valve;
the piston includes:
 a recess provided to open in the first surface; and
 a thickening portion provided to protrude from a bottom of the recess; and
the containing portion is provided at the thickening portion.

* * * * *